United States Patent
Shirokura et al.

(10) Patent No.: US 6,690,304 B1
(45) Date of Patent: Feb. 10, 2004

(54) PROTOCOL CONVERSION APPARATUS AND PROTOCOL CONVERSION METHOD

(75) Inventors: Yoshihiko Shirokura, Tokyo (JP); Syuuji Itou, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/958,559
(22) PCT Filed: Feb. 17, 2000
(86) PCT No.: PCT/JP00/00892
§ 371 (c)(1), (2), (4) Date: Oct. 10, 2001
(87) PCT Pub. No.: WO01/61963
PCT Pub. Date: Aug. 23, 2001

(51) Int. Cl.$^7$ ............................................. H03M 7/00
(52) U.S. Cl. .......................... 341/50; 370/466; 370/401
(58) Field of Search .......................... 341/50; 375/222; 370/401, 466, 465, 467

(56) References Cited

U.S. PATENT DOCUMENTS

| | | | |
|---|---|---|---|
| 5,448,286 A | | 9/1995 | Decaesteke et al. |
| 5,642,352 A | * | 6/1997 | Ishida et al. ................ 370/401 |
| 5,721,731 A | * | 2/1998 | Yoshida ....................... 370/269 |
| 5,995,494 A | | 11/1999 | Horikawa |
| 6,236,469 B1 | * | 5/2001 | Watanabe et al. ........... 358/468 |
| 6,259,706 B1 | | 7/2001 | Shimada |
| 6,449,349 B1 | * | 9/2002 | Higuchi .................. 379/100.17 |
| 6,483,855 B1 | * | 11/2002 | Minagawa ................... 370/493 |
| 2002/0186709 A1 | * | 12/2002 | Takagi et al. ............... 370/465 |

FOREIGN PATENT DOCUMENTS

| | | |
|---|---|---|
| JP | 6-225111 A | 8/1994 |
| JP | 6-261094 A | 9/1994 |
| JP | 8-46723 A | 2/1996 |
| JP | 9-214561 A | 8/1997 |
| JP | 9-233216 A | 9/1997 |
| JP | 10-98502 A | 4/1998 |
| JP | 11-98265 A | 4/1999 |
| JP | 11-127215 A | 5/1999 |
| JP | 11-127216 A | 5/1999 |
| JP | 11-136396 A | 5/1999 |

OTHER PUBLICATIONS

Rijkse, K., "ITU standardization of very low bitrate video coding algorithms", Signal Processing: Image Communication Elsevier Science Pub., Amsterdam, NL, vol. 7, No. 4, Nov. 1, 1995, pp. 553–565, XP004047099.

Acomb, S., "Modem Testing in a Production Environment", Autotestcon '98 IEEE Systems Readiness Tech. Conf., 1998 IEEE Salt Lake City, UT, USA Aug. 24–27, 1998, N.Y., N.Y. USA, IEEE, Aug. 24, 1998, pp. 398–404, XP010299442.

Uchiyama, H., et al., "Measurement and Reduction of Facsimile Communication Time in Analog and Digital Cellular Systems", Vehic. Tech. Conf., 1994 IEEE 44th Stockholm, Sweden, Jun. 8–10, N.Y., N.Y., USA IEEE, Jun. 8, 1994, pp. 1011–1014, XP010123228.

* cited by examiner

Primary Examiner—Brian Young
Assistant Examiner—John Nguyen
(74) Attorney, Agent, or Firm—Rothwell, Figg, Ernst & Manbeck

(57) ABSTRACT

A control unit (100) sets up a path in a protocol conversion apparatus (30) based on call setting information from the calling side terminal. A signal monitor unit (300) monitors main data 220a transmitted in the path and sent/received between the terminals. When a specific connectivity confirmation sequence is detected by the signal monitor unit (300), the result is forwarded to the control unit (100). Based on the forwarded result, the control unit (100) specifies a protocol of the calling side terminal and a protocol of the called side terminal. A protocol conversion unit (310) performs the most suitable protocol conversion based on the specified protocols.

15 Claims, 18 Drawing Sheets

PROTOCOL CONVERSION APPARATUS AND PROTOCOL CONVERSION METHOD

TECHNICAL FIELD

This invention relates to a protocol conversion apparatus and protocol conversion method for selecting a protocol for data transmitted between a plurality of terminals to be the most suitable protocol at each terminal or a network, and performing adjusting operation between protocols of each terminal.

BACKGROUND ART

FIG. 16 shows an applied connection example of a conventional protocol conversion apparatus disclosed in the Unexamined Japanese Patent Publication 11-127216. FIG. 17 shows an internal configuration of the conventional protocol conversion apparatus. FIG. 18 is a flowchart showing operations performed by the conventional protocol conversion apparatus.

In FIG. 16, the following are shown: a terminal A 10 connected to a closed area network, a terminal B 20 connected to a public network, a protocol conversion apparatus 30 which connects the terminals A and B by converting protocols when necessary, a closed area network 40 for connecting the terminal A and the protocol conversion apparatus, and a public network 50 for connecting the terminal B and the protocol conversion apparatus.

In FIG. 17, the following are shown: a control unit 100 for controlling the protocol conversion apparatus, and for sending and receiving control signals to/from the terminals, and a closed area network interface unit 110 for interfacing with the closed area network. The closed area network interface unit 110 sends/receives main data to/from a switching unit in the apparatus, and sends/receives control signals for the terminals to/from the control unit. A public network interface unit 120 for interfacing with the public network is also shown. The public network interface unit 120 sends/receives main data to/from the switching unit in the apparatus, and sends/receives control signals for the terminals to/from the control unit. A switching unit 130 for connecting cards for a transmission of main data, a control signal 200 from the terminal A or the closed area network, a control signal 210 from the terminal B or the public network, a main data signal 220 transmitted between the terminal A and the terminal B, and a protocol conversion unit 310 for converting PCM speech data of 64 Kbps to compressed speech data of 8 Kbps are also shown in FIG. 17.

Now, operations will be explained. With reference to FIGS. 16 and 17, it is supposed that the terminal B 20 transmits signals and the terminal A 10 receives the signals. The control signal 210 indicating a transmission of signals from the terminal B 20 is input into the public network interface unit 120 of the protocol conversion apparatus 30, and the information is forwarded to the control unit 100 from the public network interface unit 120. The control unit 100 analyzes the contents of the control signal 210 and detects the type of a bearer required to be used for transmission.

When the bearer requested by the terminal B 20 is non-restricted digital data of 64 Kbps, the control unit controls the switching unit 130 in order to establish a path for the main data 220 on a non-restricted digital bearer of 64 Kbps between the public network interface unit 120 and the closed area network interface unit 110.

On the other hand, if the bearer requested by the terminal B 20 is speech, the control unit directs the switching unit 130 and a suitable protocol conversion unit 310 to set up a path for the main data 220 through the public network interface unit 120, the protocol conversion unit 310, and the closed area network interface unit 110.

In this case, the protocol conversion unit 30 performs a mutual conversion between the PCM speech signal of 64 Kbps and the compressed speech signal of 8 Kbps. Thus, the PCM speech signal of 64 Kbps can be transmitted between the terminal B 20 and the protocol conversion apparatus 310, and the compressed speech signal of 8 Kbps can be transmitted between the protocol conversion apparatus 30 and the terminal A 10.

In the case of an image terminal, a FAX, a MODEM, or others, only a basic bearer is selected based on the control signal at the sending/receiving time, and after the bearer is connected, the connectivity between the terminals is confirmed based on a protocol between the terminals. Then, the protocol which has been confirmed of providing mutual connectivity is used for communications.

However, in the conventional protocol conversion apparatus, the protocol requested by the terminal is judged based only on the contents of control signals from the terminal or the network. It is only possible to judge a basic point, such as whether data output from the terminal is digital data or speech data, based on the contents of the control signals. Therefore, only a conversion for a basic bearer can be performed in the conventional protocol conversion apparatus. Thus, it has been impossible to perform the most suitable protocol conversion.

For instance, when image terminals respectively using different protocols are to be connected, it is just possible to judge that data is non-restricted digital data of 64 Kbps based on the control signal, in the conventional protocol conversion apparatus. Then, at the sequence of confirming the connectivity between the image terminals to be performed later, the protocol which can be used in both the terminals is selected, or the communications is disconnected by the terminals if the connectivity is not confirmed. In usual cases, the best function which the terminal can perform may mostly be limited in the protocol which can be used for both the terminals.

It is one of objects of the present invention to solve the above problem, and it is another object to elicit the function of each terminal as much as possible and to perform the most suitable protocol conversion.

DISCLOSURE OF THE INVENTION

According to one aspect of protocol conversion apparatus of the present invention, the protocol conversion apparatus, connected to a calling side terminal and a called side terminal, for performing protocol conversion between the calling side terminal and the called side terminal, comprises:
a protocol conversion unit for performing protocol conversion between a calling side protocol of the calling side terminal and a called side protocol of the called side terminal;
a signal detect unit for detecting a connectivity confirmation signal transmitted between the calling side terminal and the called side terminal; and
a control unit for specifying the calling side protocol and the called side protocol based on the connectivity confirmation signal detected by the signal detect unit;
wherein the protocol conversion unit can perform protocol conversions of plural types,
wherein the control unit selects one protocol conversion out of the protocol conversions of plural types performed by the protocol conversion unit, based on a specified calling side protocol and a specified called side protocol, and wherein the protocol conversion unit performs the protocol conversion selected by the control unit.

According to another aspect of protocol conversion apparatus of the present invention, the protocol conversion apparatus, connected to a calling side terminal and a called side terminal, for performing protocol conversion between the calling side terminal and the called side terminal, the protocol conversion apparatus further connected to a protocol conversion software database storing a plurality of protocol conversion software of plural types corresponding to protocol conversion types, the protocol conversion apparatus comprises:

a protocol conversion unit for performing protocol conversion between a calling side protocol of the calling side terminal and a called side protocol of the called side terminal;

a signal detect unit for detecting a connectivity confirmation signal transmitted between the calling side terminal and the called side terminal; and a control unit for specifying the calling side protocol and the called side protocol based on the connectivity confirmation signal detected by the signal detect unit;

wherein the control unit selects one protocol conversion software out of the plurality of protocol conversion software of plural types based on a specified calling side protocol and a specified called side protocol, and gives the protocol conversion unit directions to download a selected protocol conversion software, and wherein the protocol conversion unit downloads the selected protocol conversion software based on the directions of the control unit.

According to another aspect of protocol conversion apparatus of the present invention, the signal detect unit detects the connectivity confirmation signal by monitoring a main data signal transmitted between the calling side terminal and the called side terminal.

According to another aspect of protocol conversion apparatus of the present invention, the control unit sets up a line between the protocol conversion unit and the called side terminal, based on the connectivity confirmation signal detected by the signal detect unit.

According to another aspect of protocol conversion apparatus of the present invention, the control unit has made the protocol conversion unit be ready for starting before the signal detect unit detects the connectivity confirmation signal.

According to another aspect of protocol conversion apparatus of the present invention, the signal detect unit is included in the protocol conversion unit.

According to another aspect of protocol conversion apparatus of the present invention, the signal detect unit detects H221/H242 or H223/H245 based on ITU-T Recommendation used as the connectivity confirmation signal for image data communication.

According to another aspect of protocol conversion apparatus of the present invention, the signal detect unit detects one of T30, V34, and V90 based on ITU-T Recommendation used as the connectivity confirmation signal for FAX/MODEM communication.

According to one aspect of protocol conversion method of the present invention, the protocol conversion method, for performing protocol conversion between a calling side terminal and a called side terminal, comprises the steps of:

detecting a connectivity confirmation signal transmitted between the calling side terminal and the called side terminal;

specifying a calling side protocol and a called side protocol based on the connectivity confirmation signal detected in the detecting step; and performing protocol conversion between the calling side protocol of the calling side terminal and the called side protocol of the called side terminal;

wherein the performing protocol conversion step can perform protocol conversions of plural types, wherein the specifying the calling side protocol and the called side protocol step selects one protocol conversion out of the protocol conversions of plural types performed in the performing protocol conversion step, based on a specified calling side protocol and a specified called side protocol, and wherein the performing protocol conversion step performs protocol conversion selected in the specifying the calling side protocol and the called side protocol step.

BEST MODE FOR CARRYING OUT THE INVENTION

Embodiment 1.

Figure 1:
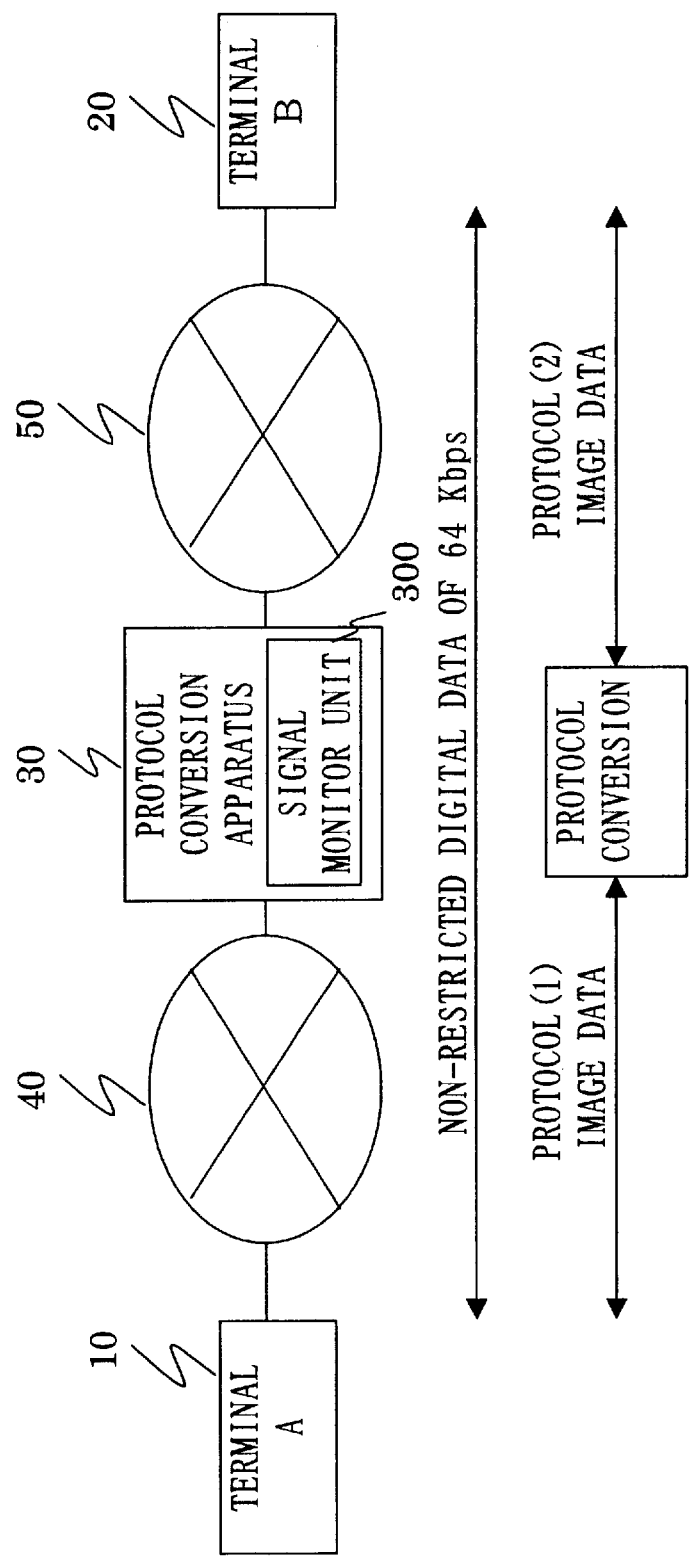
FIG. 1 shows a connection state of protocol conversion apparatus according to Embodiment 1.
Figure 2:
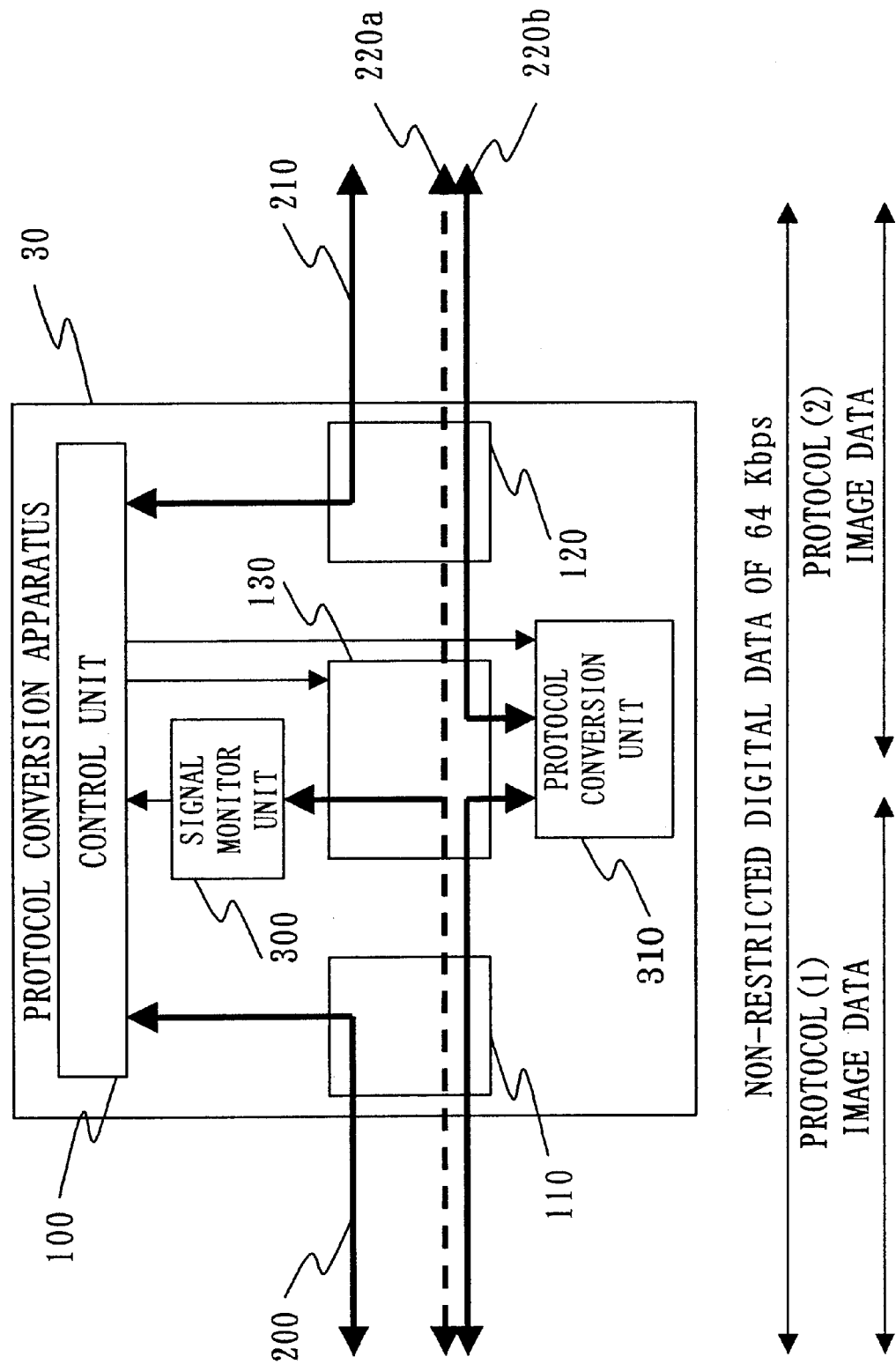
FIG. 2 shows an internal configuration of the protocol conversion apparatus according to Embodiment 1.
Figure 3:
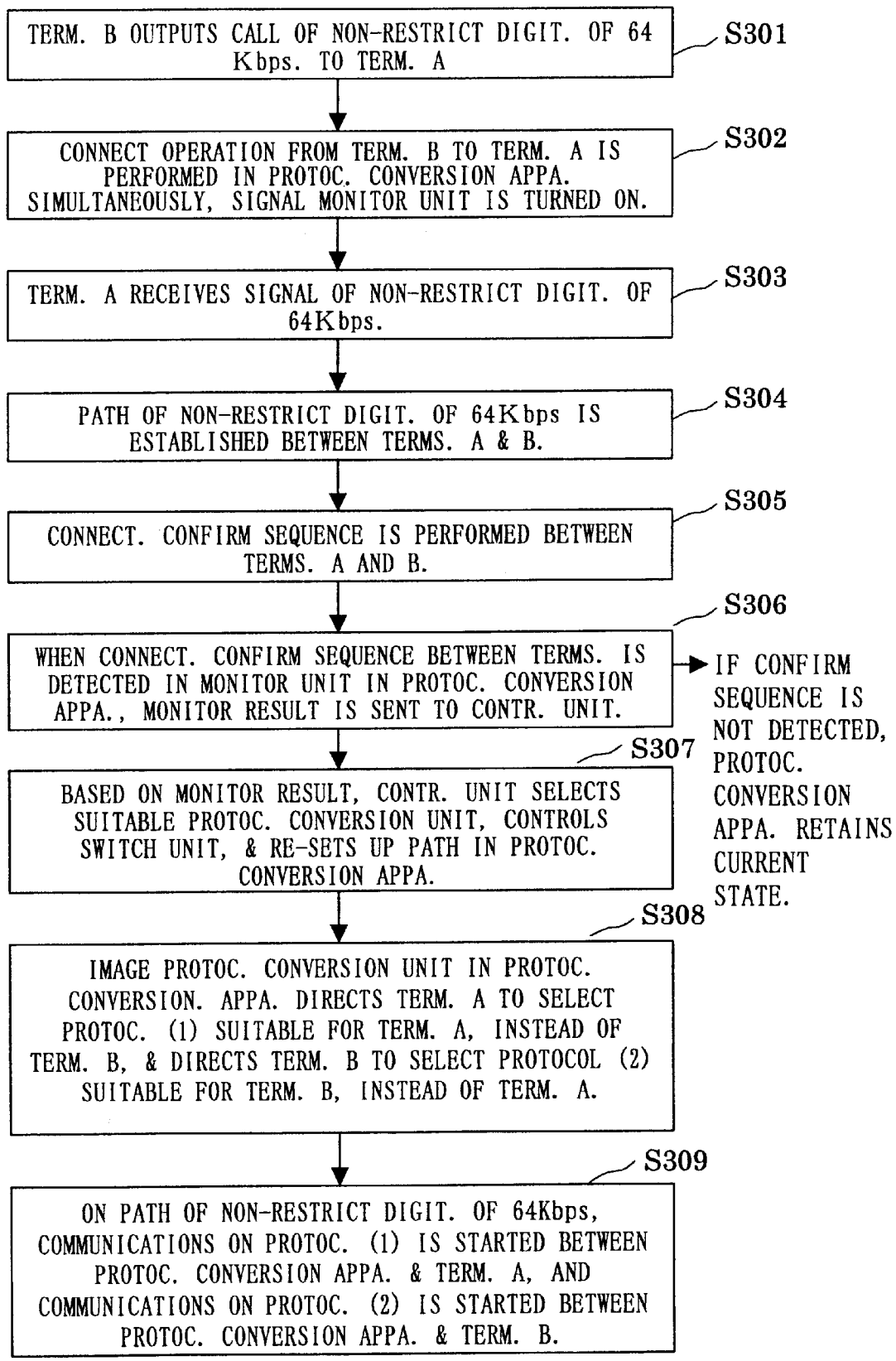
FIG. 3 shows operations of the protocol conversion apparatus and a protocol conversion method according to Embodiment 1.

FIG. 1 shows a connection state of protocol conversion apparatus according to Embodiment 1. FIG. 2 shows an internal configuration of the protocol conversion apparatus of Embodiment 1. FIG. 3 is a flowchart showing operations and a protocol conversion method according to Embodiment 1.

In FIG. 1, the following are provided: a terminal A 10 connected to a closed area network, a terminal B 20 connected to a public network, a protocol conversion apparatus 30 which connects the terminals A and B by converting protocols when necessary, a closed area network 40 for connecting the terminal A and the protocol conversion apparatus, a public network 50 for connecting the terminal B and the protocol conversion apparatus, and a signal monitor unit 300 for monitoring main data transmitted between the terminals A and B as a signal detection unit.

In FIG. 2, the following are shown: a control unit 100 for controlling the protocol conversion apparatus, collecting information from the signal monitor unit, and sending/receiving control signals to/from the terminal, and a closed area network interface unit 110 for interfacing with the closed area network. The closed area network interface unit 110 sends/receives main data to/from a switching unit in the apparatus, and sends/receives the control signals for the terminals to/from the control unit. A public network interface unit 120 for interfacing with the public network is also shown. The public network interface unit 120 sends/receives main data to/from the switching unit in the apparatus, and sends/receives the control signals for the terminals to/from the control unit. A switching unit 130 for connecting cards for a transmission of main data, a control signal 200 from the terminal A or the closed area network, a control signal 210 from the terminal B or the public network, main data signals 220a and 220b transmitted between the terminal A and the terminal B, and a protocol conversion unit 310 which can perform protocol conversions of plural types are also shown in FIG. 2.

Operations of the protocol conversion apparatus and a protocol conversion method will be explained.

In FIGS. 1, 2, and 3, it is assumed that the terminal B 20 is an image terminal and the best ability of the terminal B 20 can be shown when it performs communications on a non-restricted digital bearer of 64 Kbps by using an image protocol (2). It is also assumed that the terminal A 10 is an image terminal and the best ability of the terminal A 10 can be shown when it performs communications on the non-restricted digital bearer of 64 Kbps by using an image protocol (1).

Now, the case of the terminal B 20 transmitting signals and the terminal A 10 receiving the signals will be described. The terminal B 20 outputs a call of non-restricted digital of 64 Kbps to the terminal A 10 at S301. The control signal 210 indicating a transmission of signals from the terminal B 20 is input into the public network interface unit 120 of the protocol conversion apparatus 30, and the information is forwarded to the control unit 100 from the public network interface unit 120. The control unit 100 analyzes the contents of the control signal 210 and detects the type of a bearer required to be used for transmission. As the bearer requested by the terminal B 20 is the non-restricted digital bearer of 64 Kbps in this case, the control unit 100 controls the switching unit 130 in order to establish a path for the main data 220a on the non-restricted digital bearer of 64 Kbps between the public network interface unit 120 and the closed area network interface unit 110.

At the same time, the control unit 100 turns on the signal monitor unit 300, which is a signal detection unit, at S302 through S304. After the path for transmission is set up, a connectivity confirmation sequence is performed between the terminal A and the terminal B at S305. The connectivity confirmation operation is performed with using the main data path 220a of non-restricted digital of 64 Kbps.

The signal monitor unit always monitors the non-restricted digital path of 64 Kbps set up in the switching unit 130 in order to detect whether a predefined specific connectivity confirmation sequence (connectivity confirmation signal) is sent/received or not. Since only non-restricted digital data of 64 Kbps is transferred at this time, the protocol conversion unit is not turned on.

The signal monitor unit 300 detects the connectivity confirmation signal. Detecting the connectivity confirmation signal, the signal monitor unit 300 informs the control unit 100 of the contents of the connectivity confirmation signal at S306. The control unit 100 specifies the protocol for the terminal A 10 and the terminal B 20 based on the informed contents, and selects the most suitable protocol conversion unit at S307. In the present Embodiment, the protocol conversion unit 310 for image is made to be active, and the switching unit 130 is controlled at the same time in order to establish a path for main data 220b through the public network interface unit 120, the protocol conversion unit 310 for image, and the closed area network interface unit 110 at S307.

After the protocol conversion unit 310 becoming active and the path having been established, the protocol conversion unit 310 selects the protocol (1) which is most suitable for the terminal A 10 and responds the protocol (1) to the terminal A 10, and selects the protocol (2) which is most suitable for the terminal B 20 and responds the protocol (2) to the terminal B 20 at S308. Then, the communications based on the image protocol (1) is started on the non-restricted digital bearer of 64 Kbps between the terminal A 10 and the protocol conversion unit 310, and the communications based on the image protocol (2) is started on the non-restricted digital bearer of 64 Kbps between the terminal B 20 and the protocol conversion unit 310. Simultaneously, the protocol conversion unit 310 performs a mutual conversion process between the image protocol (1) and the image protocol (2), and establishes the communications between the terminal A 10 and the terminal B 20 at S309.

If the connectivity confirmation sequence between the terminals, which has been predefined, is not confirmed in the signal monitor unit 300, the protocol conversion apparatus 30 operates only on the main data path 220a of non-restricted digital bearer of 64 Kbps between the public network interface unit 120 and the closed area network interface unit 110.

In the present Embodiment, as stated above, the signal monitor unit monitors a connectivity confirmation signal transmitted between the terminals after the bearer is set up. Then, the control unit sets up a path in the apparatus based on the monitor result, and the protocol conversion unit performs the most suitable protocol conversion. Consequently, it is possible to perform mutual communications utilizing the best function of each terminal.

Embodiment 2.

Figure 4:
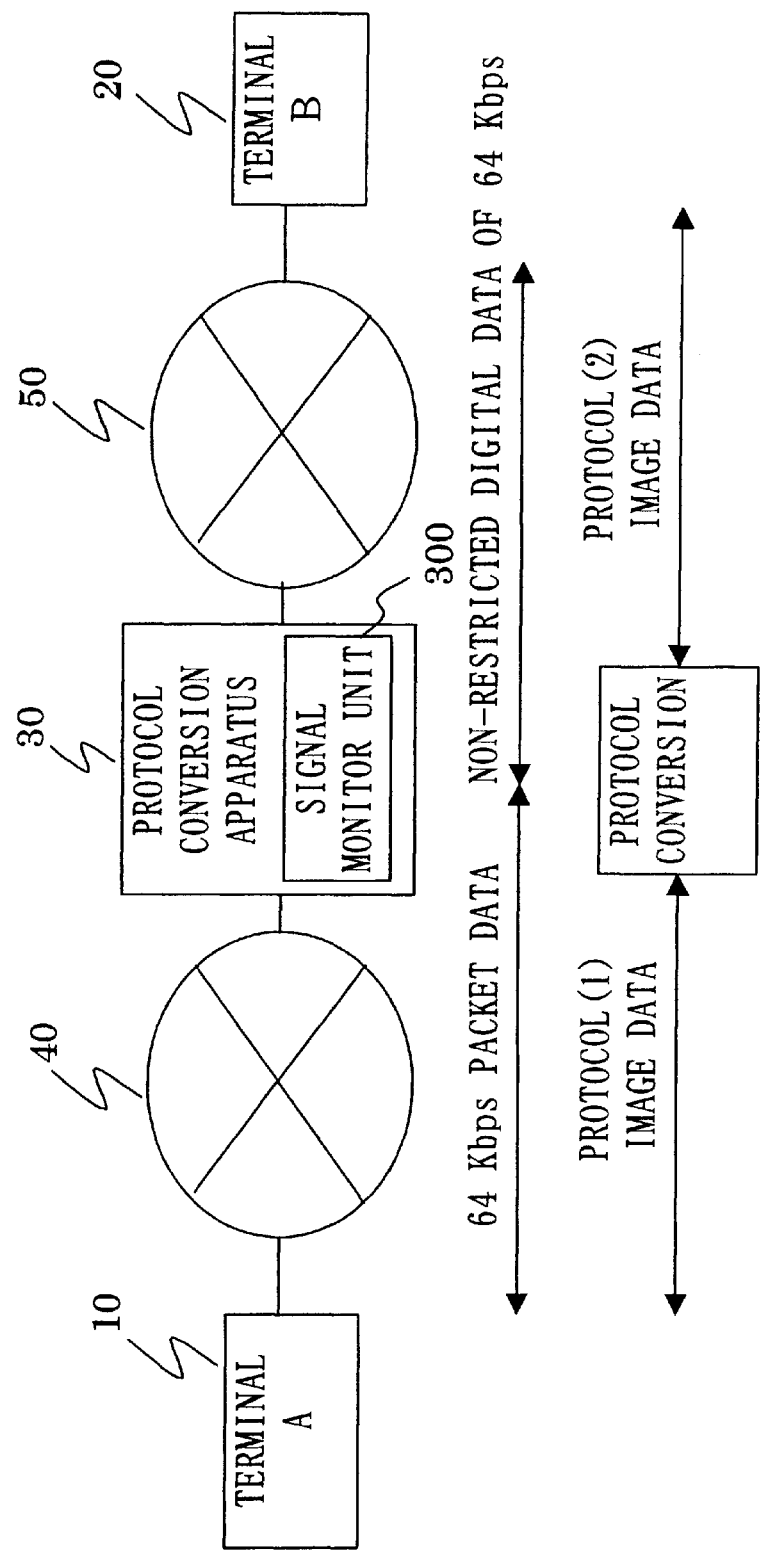
FIG. 4 shows a connection state of protocol conversion apparatus according to Embodiments 2, 3, and 5.
Figure 5:
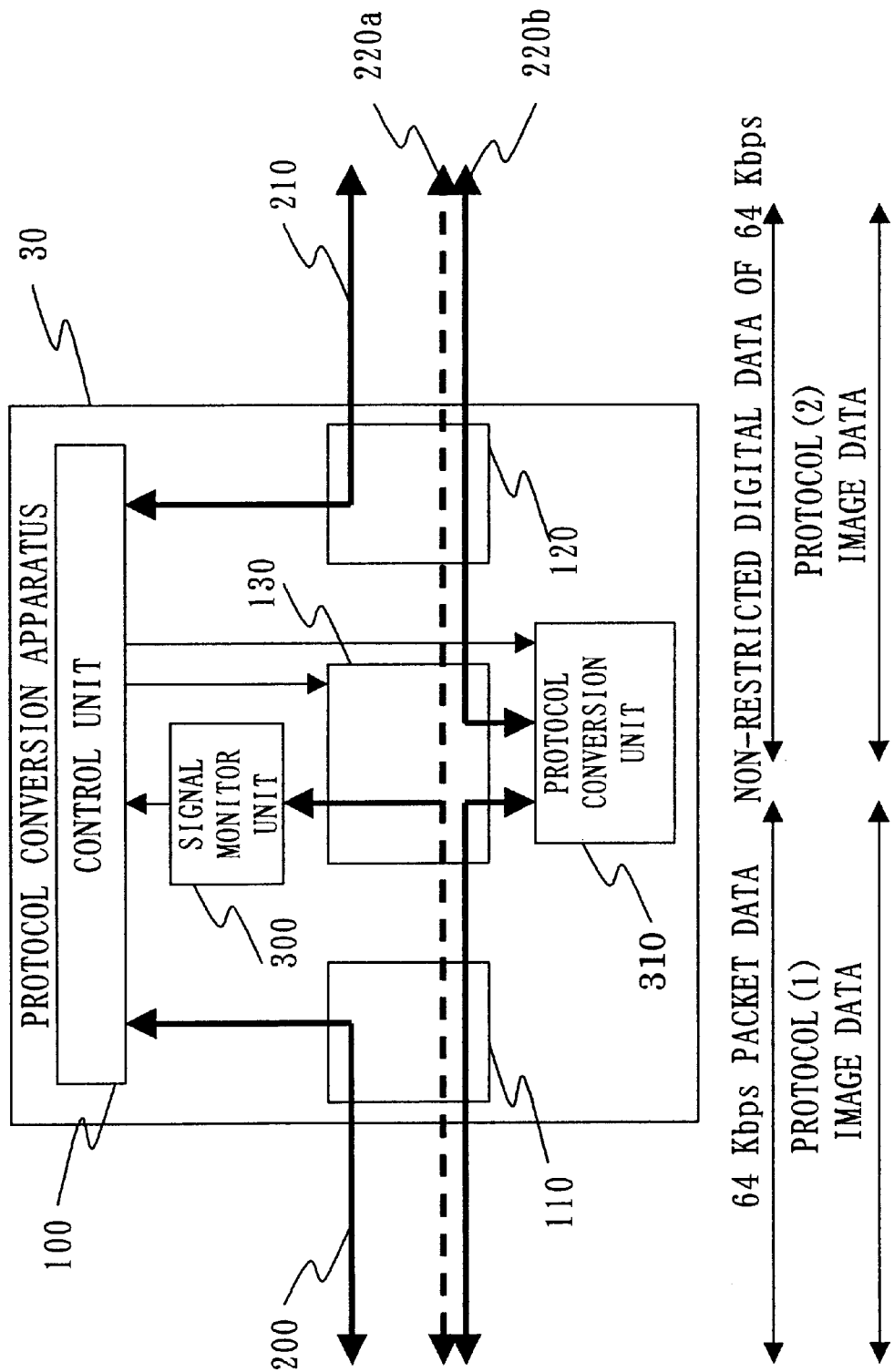
FIG. 5 shows an internal configuration of the protocol conversion apparatus according to Embodiments 2, and 3.
Figure 6:
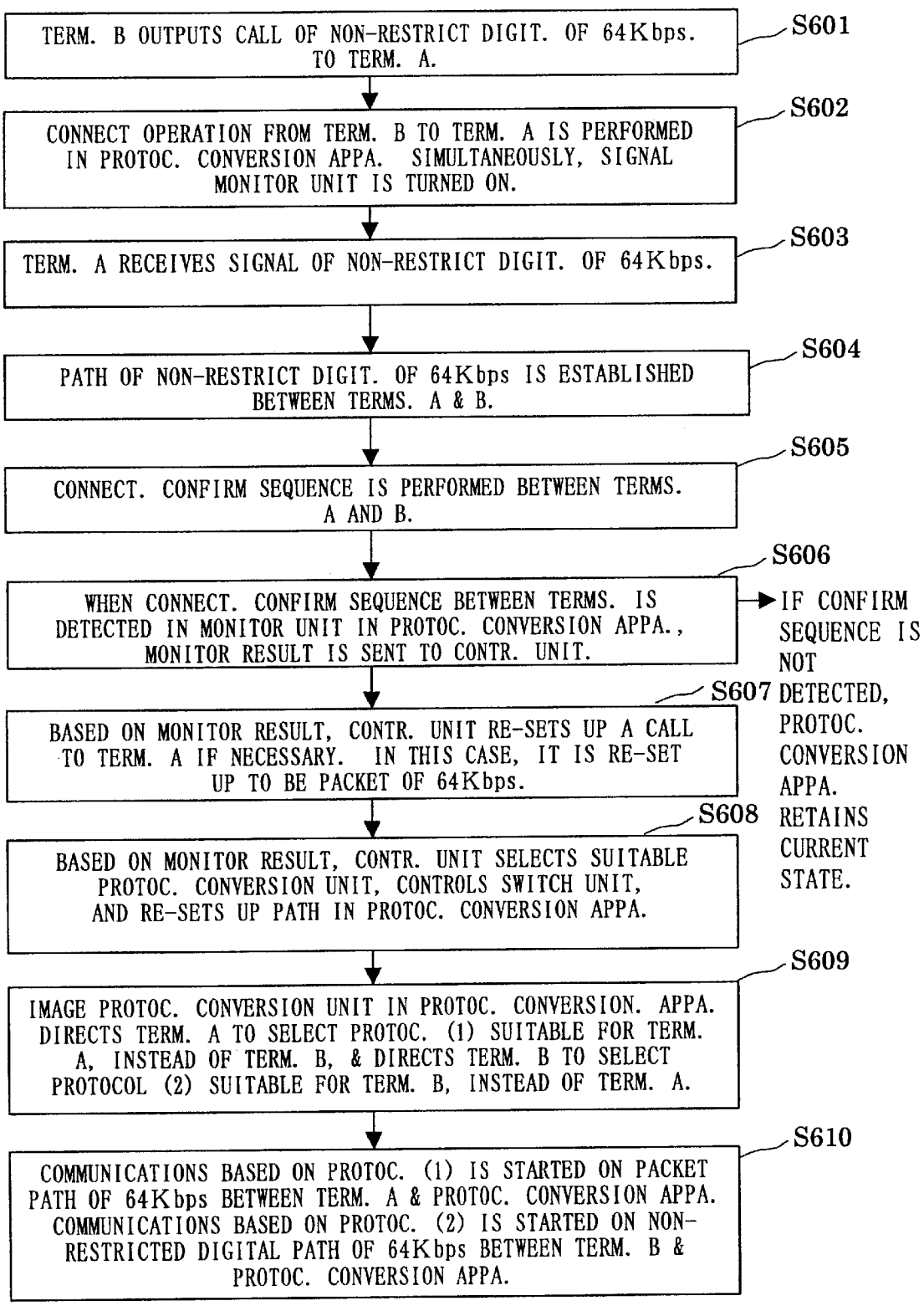
FIG. 6 shows operations of the protocol conversion apparatus a protocol conversion method according to Embodiment 2.

FIG. 4 shows a connection state of protocol conversion apparatus according to Embodiment 2. FIG. 5 shows an internal configuration of the protocol conversion apparatus of Embodiment 2. FIG. 6 is a flowchart showing operations and a protocol conversion method according to Embodiment 2. In the figures, the same numbers indicate the same elements or corresponding elements. (This will also be applied in the following explanation.)

In Embodiment 1, the non-restricted digital bearer of 64 Kbps, which has been originally set up between the terminals is not changed. In the present Embodiment, however, the bearer which has already been set up can be re-set up to be the most suitable bearer. It is assumed in the present Embodiment that the terminal A, which is a receiving side terminal, is an independent terminal, and the network of the receiving side terminal is the closed area network 40. In this case, the protocol conversion apparatus according to the present Embodiment performs protocol conversions and operations for re-setting up the bearer to be more suitable for the function of the closed area network side.

Though the configuration elements of the protocol conversion apparatus according to present Embodiment shown in FIGS. 4 and 5 are the same as those in Embodiment 1, operations of the control unit 100, and the network interface units 110 and 120 are different from those in Embodiment 1.

With reference to FIG. 6, operations of the protocol conversion apparatus and the protocol conversion method will now be explained. The operations of the terminal B 20 transmitting a signal to the terminal A, the signal monitor unit 300 becoming on, the signal is, monitor unit monitoring the connectivity confirmation sequence between the terminals after the non-restricted digital bearer of 64 Kbps having been set up, and the control unit 100 being informed of the monitor result (S601 through S606) are the same as those in Embodiment 1.

In the present Embodiment, the control unit 100 judges the most suitable transmission bearer and the terminal protocol, based on the terminal information informed by the signal monitor unit 300. For instance, if the control unit 100 judges that the bearer between the protocol conversion unit 310 and the terminal A should be re-set up, the control unit controls the closed area network interface unit 110 in order to set up a path between the terminal A 10 and the protocol conversion unit 310 to be a packet bearer of 64 Kbps for example, at S607. Simultaneously, the control unit 100 sets up a non-restricted digital bearer of 64 Kbps between the terminal B 20 and the protocol conversion unit 310.

After the protocol conversion unit 310 becoming active and the path having been set up at S608, the protocol conversion unit 310 selects the protocol (1) which is most suitable for the terminal A 10 and responds the protocol (1) to the terminal A 10 by using the packet bearer of 64 Kbps, and selects the protocol (2) which is most suitable for the terminal B 20 and responds the protocol (2) to the terminal B 20 by using the non-restricted digital bearer at S609. Then, the communications based on the image protocol (1) is started on the packet bearer of 64 Kbps between the terminal A 10 and the protocol conversion unit 310, and the communications based on the image protocol (2) is started on the non-restricted digital bearer of 64 Kbps between the terminal B 20 and the protocol conversion unit 310 at S610.

Simultaneously, the protocol conversion unit 310 performs a mutual conversion process between the packet bearer of 64 Kbps and the non-restricted digital bearer of 64 Kbps and a mutual conversion process between the image protocol (1) and the image protocol (2), and establishes the communications between the terminal A 10 and the terminal B 20.

In the present Embodiment, as stated above, the signal monitor unit monitors a connectivity confirmation signal transmitted between the terminals after the bearer has been set up. Then, based on the monitor result, the control unit re-sets up the path between the protocol conversion unit and the terminal, and the path in the apparatus, and makes the protocol conversion unit perform the most suitable protocol conversion. Consequently, it is possible to perform mutual communications utilizing the best function of each terminal.

Embodiment 3.

Figure 7:
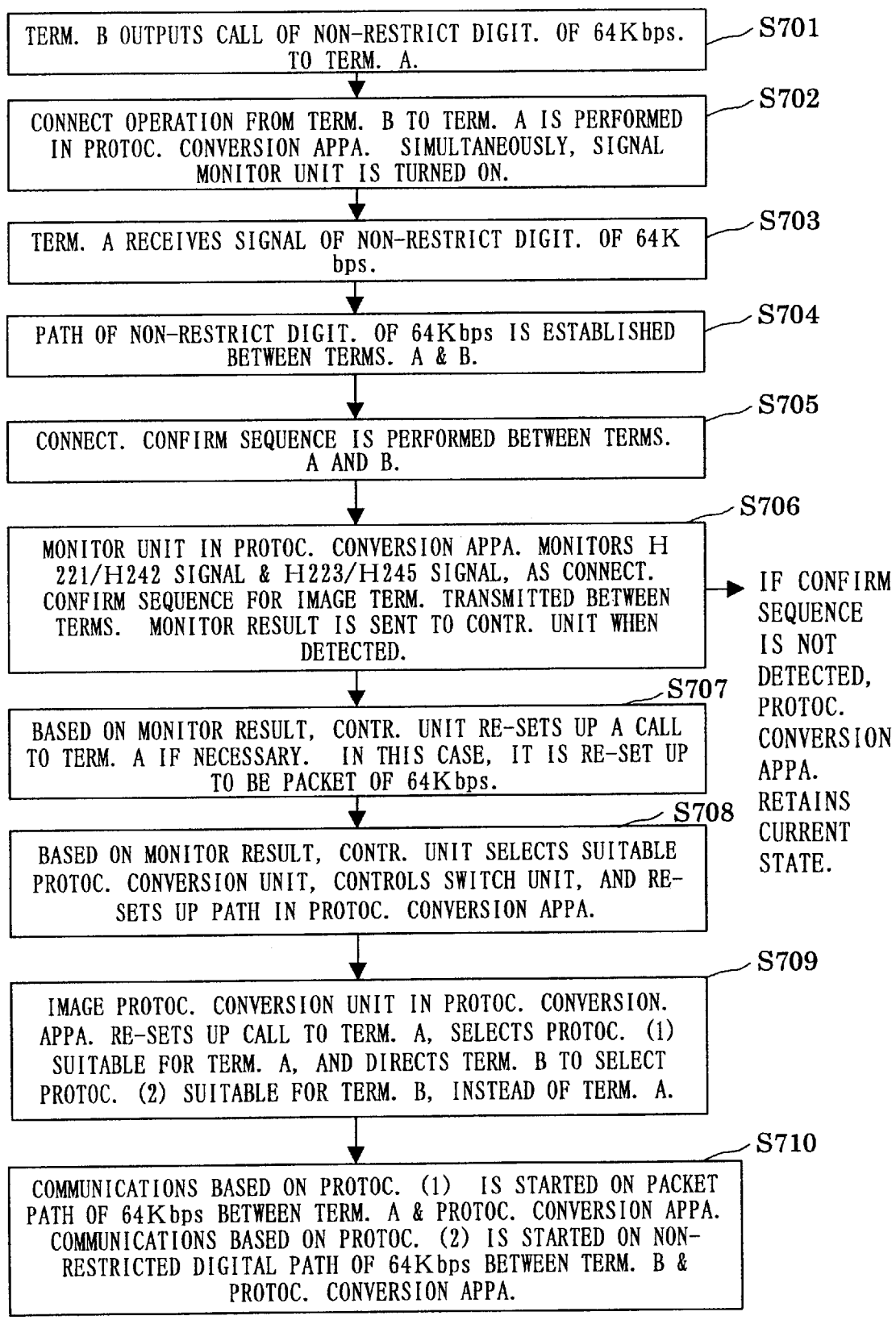
FIG. 7 shows operations of the protocol conversion apparatus a protocol conversion method according to Embodiment 3.

FIG. 4 shows a connection state of protocol conversion apparatus according to Embodiment 3. FIG. 5 shows an internal configuration of the protocol conversion apparatus of Embodiment 3. FIG. 7 is a flowchart showing operations and a protocol conversion method according to Embodiment 3.

In the present Embodiment, the signal monitor unit 300 monitors signals of H221/H242, and H223/H245 of ITU-T Recommendations, used in TV conference terminals and so on, as the connectivity confirmation signal between terminals described in Embodiments 1 and 2, in order to perform the above operations. The signal monitor unit 300 monitors the H221/H242 signal and the H223/H245 signal at the same time. When the signal monitor unit detects both the signals or either signal of them, the signal monitor unit transmits the information to the control unit 100.

The H221, and H223 are standards indicating frame configurations of audio visual (AV) terminal. The H242, and H245 are standards indicating procedures for establishing communications between the AV terminals. It depends on a terminal type and a transmission rate which to use the H221/H242 or the H223/H245 at each terminal.

As shown in FIG. 7, it is assumed that a similar operation to Embodiment 2 is performed in the present Embodiment. The operations of the terminal B 20 transmitting a signal to the terminal A, the signal monitor unit 300 becoming on, the signal monitor unit monitoring the connectivity confirmation sequence between the terminals after the non-restricted digital bearer of 64 Kbps having been set up, and the control unit 100 being informed of the monitor result (S701 through S706) are the same as those in Embodiment 1.

In the present Embodiment, the signal monitor unit monitors the H221/H242 signal and the H223/H245 signal at S706, as a connectivity confirmation sequence for image terminal transmitted between the terminals. It is assumed that the terminal A complies with the H223/H245 and the terminal B complies with the H221/H242 in the present Embodiment.

Next, the control unit 100 judges the most suitable transmission bearer and the terminal protocol, based on the terminal information informed by the signal monitor unit 300. For instance, if the control unit 100 judges that the bearer between the protocol conversion unit 310 and the terminal A should be re-set up, the control unit controls the closed area network interface unit 110 in order to set up a path between the terminal A 10 and the protocol conversion unit 310 to be a packet bearer of 64 Kbps for example, at S707. Simultaneously, the control unit 100 sets up a non-restricted digital bearer of 64 Kbps between the terminal B 20 and the protocol conversion unit 310.

After the protocol conversion unit 310 becoming active and the path having been established at S708, the protocol conversion unit 310 selects the protocol (1) corresponding to the H223/H245 and responds the protocol (1) to the terminal A 10 by using the packet bearer of 64 Kbps. The protocol conversion unit 310 selects the protocol (2) corresponding to H221/H242 and responds the protocol (2) to the terminal B 20 by using the non-restricted digital bearer of 64 Kbps at S609. Then, the communications based on H223/H245 is started on the packet bearer of 64 Kbps between the terminal A 10 and the protocol conversion unit 310, and the communications based on H221/H242 is started on the nonrestricted digital bearer of 64 Kbps between the terminal B 20 and the protocol conversion unit 310 at S610.

Simultaneously, the protocol conversion unit 310 establishes the communications between the terminal A 10 and the terminal B 20 by performing a mutual conversion process between the packet bearer of 64 Kbps and the non-restricted digital bearer of 64 Kbps, and a mutual conversion process between the protocol (1) corresponding to H223/H245 and the protocol (2) corresponding to H221/H242.

By dint of the above configuration, it is possible to realize the mutual connection where the quality deterioration is minimized, between AV terminals supporting H221/H242 and H223/H245.

Embodiment 4.

Figure 8:
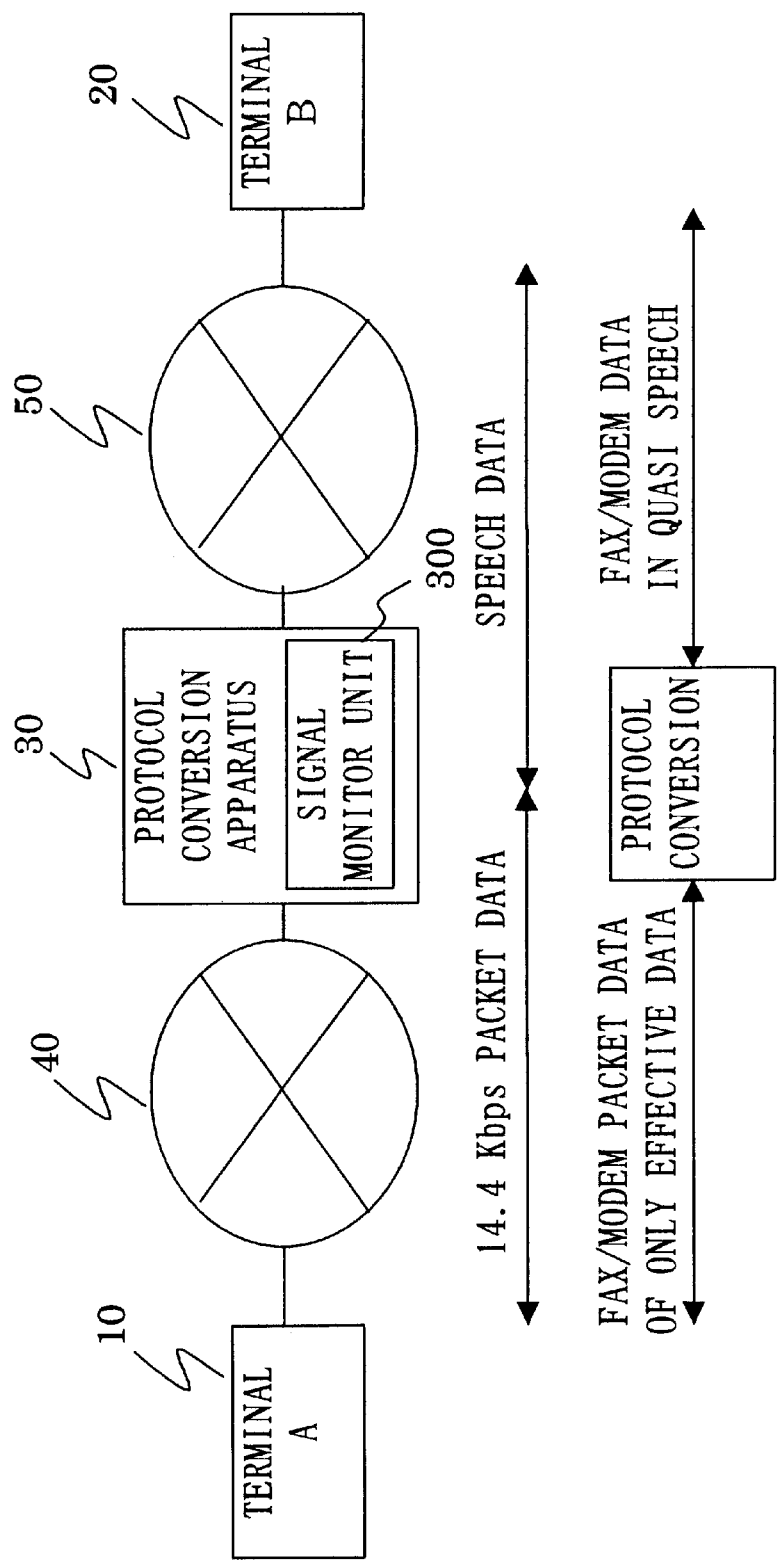
FIG. 8 shows a connection state of protocol conversion apparatus according to Embodiment 4.
Figure 9:
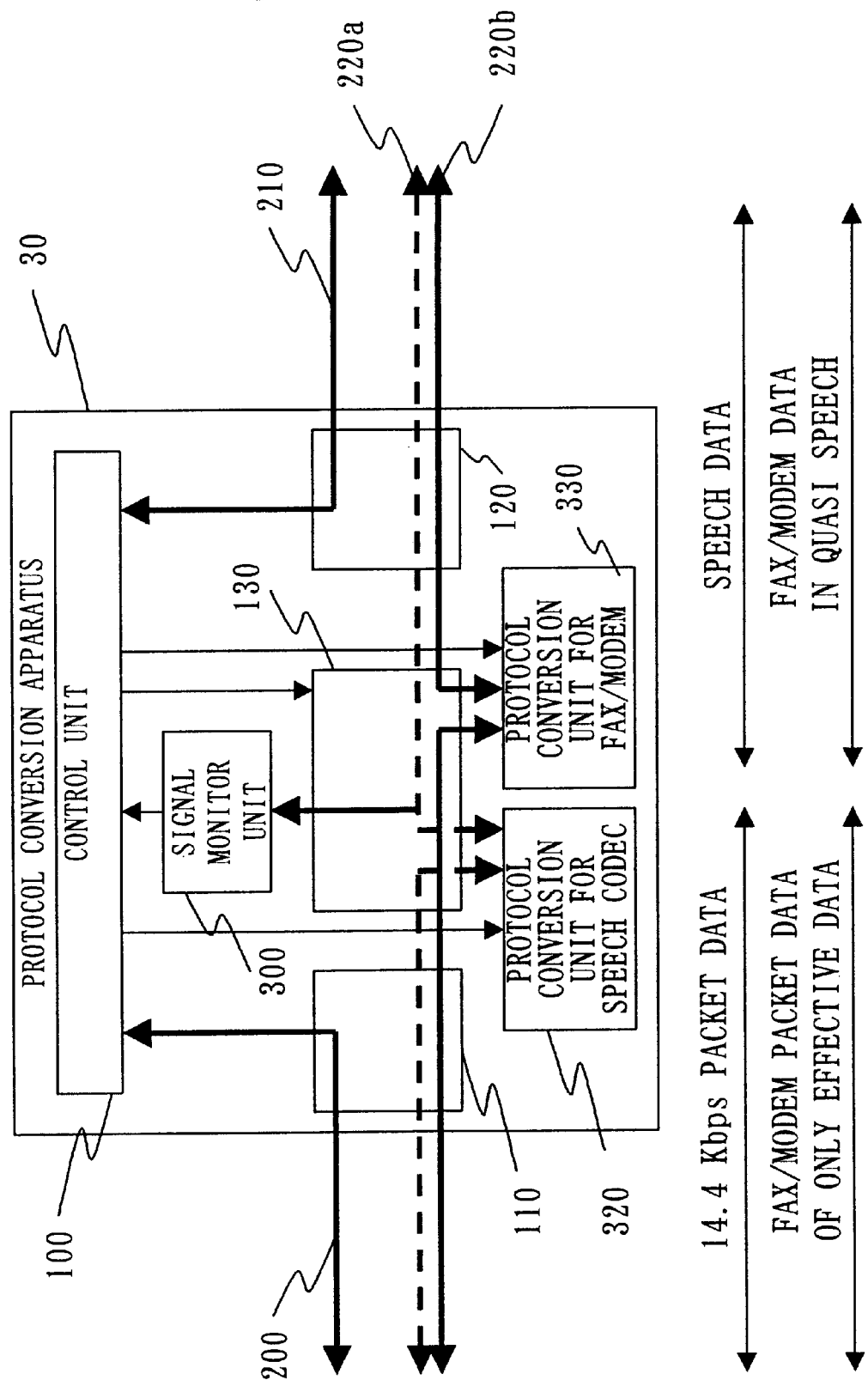
FIG. 9 shows an internal configuration of the protocol conversion apparatus according to Embodiment 4.
Figure 10:
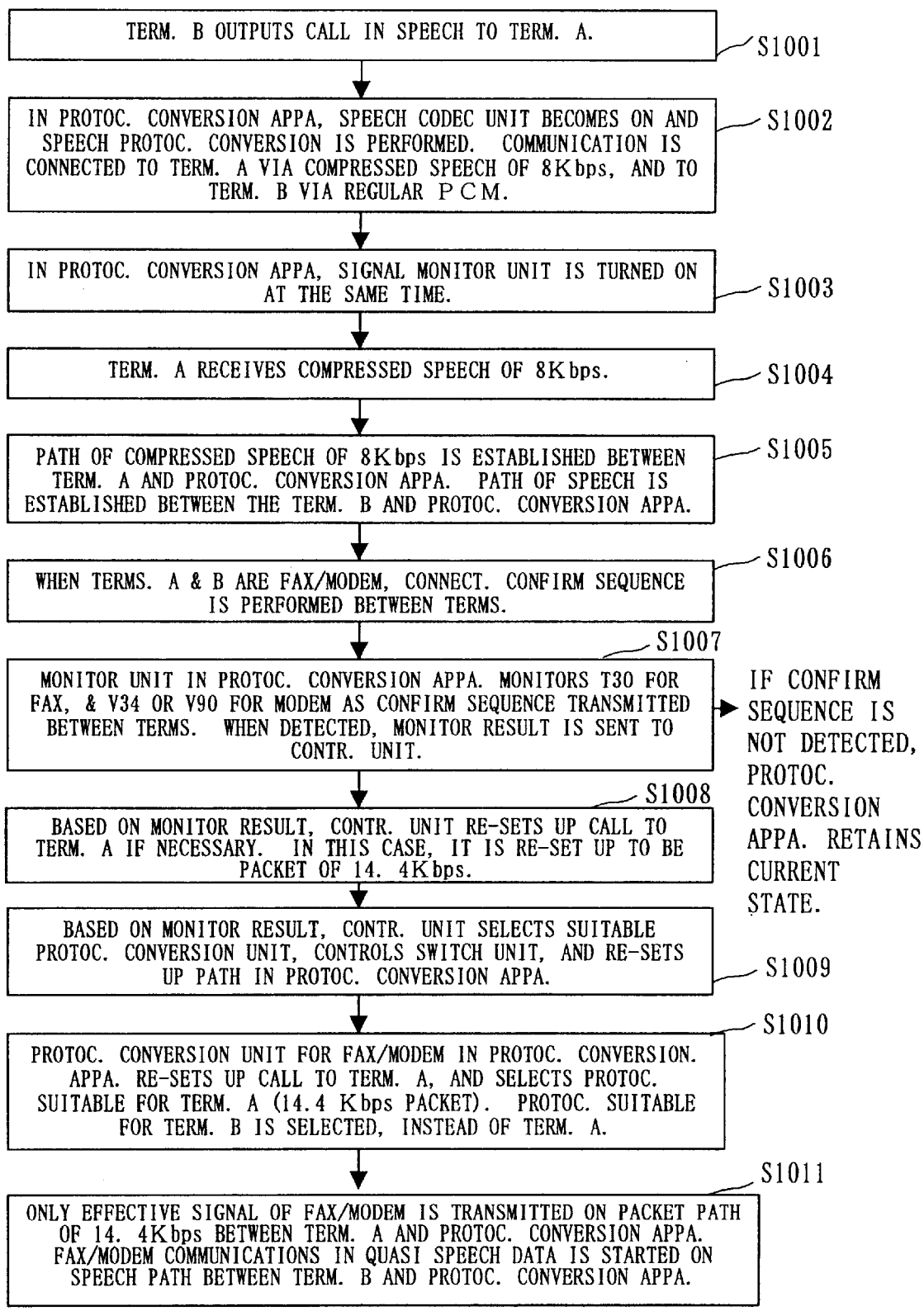
FIG. 10 shows operations of the protocol conversion apparatus and a protocol conversion method according to Embodiment 4.

FIG. 8 shows a connection state of protocol conversion apparatus according to Embodiment 4. FIG. 9 shows an internal configuration of the protocol conversion apparatus of Embodiment 4. FIG. 10 is a flowchart showing operations and a protocol conversion method according to Embodiment 4. In FIG. 9, a protocol conversion unit 320 for speech CODEC and a protocol conversion unit 330 for FAX/MODEM are provided.

In the present Embodiment, the signal monitor unit 300 monitors signals of T30, V34, and V90 of ITU-T Recommendations, used in FAX/MODEM and so on, as the connectivity confirmation signal between terminals described in Embodiments 1 and 2, in order to perform the above operations. The signal monitor unit 300 monitors the signals of the T30, V34, and V90 at the same time. When the signal monitor unit detects either of the signals or a plurality of the signals, the signal monitor transmits the information to the control unit 100.

T30 is a standard indicating a transmission procedure of FAX terminal. V34 is a standard indicating operations of MODEM at the transmission rate of equal to or less than 33.6 Kbps. V90 is a standard indicating operations of MODEM at the transmission rate of equal to or less than 56 Kbps. It depends on a terminal type and a transmission rate which to use the T30, V34, or V90 at each terminal.

Now, the operation of the protocol conversion apparatus and the method of the protocol conversion will be explained. As shown in FIG. 10, a similar operation to the Embodiment 2 is performed in the present Embodiment.

It is assumed that the terminal B 20 outputs a call in speech to the terminal A 10. When there is the call in speech from the terminal B 20 to the terminal A at S1001, the control unit 100 detects the call in speech, turns on the protocol conversion unit 320 for speech, and sets up a path through the public network interface unit 120, the protocol conversion unit 320 for speech, and the closed area network interface unit 130. Concretely, the protocol conversion apparatus is connected to the terminal A via a compressed speech bearer of 8 Kbps, and to the terminal B via a regular PCM bearer at S1002. Simultaneously, the control unit 100 turns on the signal monitor unit 300 at S1003.

Then, the call in compressed speech of 8 Kbps is received at the terminal A at S1004, and the control unit 100 sets up a path of compressed speech of 8 Kbps to the terminal A. Therefore, the path of compressed speech of 8 Kbps is established between the terminal A 10 and the protocol conversion apparatus 30, and the path of PCM speech of 64 Kbps is established between the terminal B 20 and the protocol conversion apparatus 30 at S1005.

When the terminal A 10 and the terminal B 20 are regular speech telephones, the communications is performed in the current state. If the terminals A and B are FAX or MODEM, the connectivity confirmation sequence is performed after the above process at S1006, and data in quasi speech is transmitted. Of course, it is impossible to transmit quasi speech data of FAX/MODEM in compressed speech of 8 Kbps.

When the terminal A and the terminal B are FAX, the connectivity confirmation sequence is performed between terminals based on the T30. If the terminals A and B are MODEM, the connectivity confirmation sequence is performed based on the V34 or V90. The signal monitor unit 300 monitors all these signals. Then, if the signal monitor unit 300 detects either of these signals or a plurality of these signals, the information is forwarded to the control unit 100 at S1007.

Based on the forwarded information, the control unit 100 re-sets up the bearer at the terminal A side when necessary. In this case, the bearer is re-set up to be a packet of 14.4 Kbps at S1008. Simultaneously, the control unit 100 sets up a non-restricted digital bearer of 64 Kbps between the terminal B 20 and the protocol conversion unit 310.

Then, the control unit 100 turns on the protocol conversion unit 330 for FAX/MODEM, and controls the switching unit 130 in order to set up a path through the public network interface unit 120, the protocol conversion unit 330 for FAX/MODEM and the closed area network interface unit 130 at S1009.

After the protocol conversion unit 330 for FAX/MODEM becomes active and the path has been set up, the protocol conversion unit 330 for FAX/MODEM selects the most suitable protocol (transmission rate) for the terminal A 10 by using the packet bearer of 14.4 Kbps, and responds the most suitable protocol to the terminal A 10. The protocol conversion unit 330 for FAX/MODEM selects the most suitable protocol (transmission rate) for the terminal B 20 by using the speech bearer, and responds the most suitable protocol to the terminal B at S1010. Therefore, communications in which only effective data by packet on the packet bearer of 14.4 Kbps is transmitted in a packet, is started between the terminal A 10 and the protocol conversion unit 310. Communications in which FAX/MODEM signals in quasi speech is transmitted, is started on the speech bearer between the terminal B 20 and the protocol conversion unit 310. Simultaneously, a mutual conversion process between the packet bearer of 14.4 Kbps and the speech bearer, and a mutual conversion process between the FAX/MODEM signal composed of only the effective data and the FAX/MODEM signal of quasi speech are performed in the protocol conversion unit 330 for FAX/MODEM. Thus, the communications between terminals A and B is realized at S1011.

By dint of the configuration stated above, it is possible to realize the mutual connection where the quality deterioration is minimized and the band is effectively utilized, between FAX/MODEM terminals supporting T30, V34, and V90.

Embodiment 5.

In Embodiments 1 through 4, the protocol conversion unit independently performs the protocol conversions of plural types. In the present Embodiment, the protocol conversion is performed by downloading protocol conversion software from a database for protocol conversion software, which stores protocol conversion software used for protocol conversions.

Figure 11:
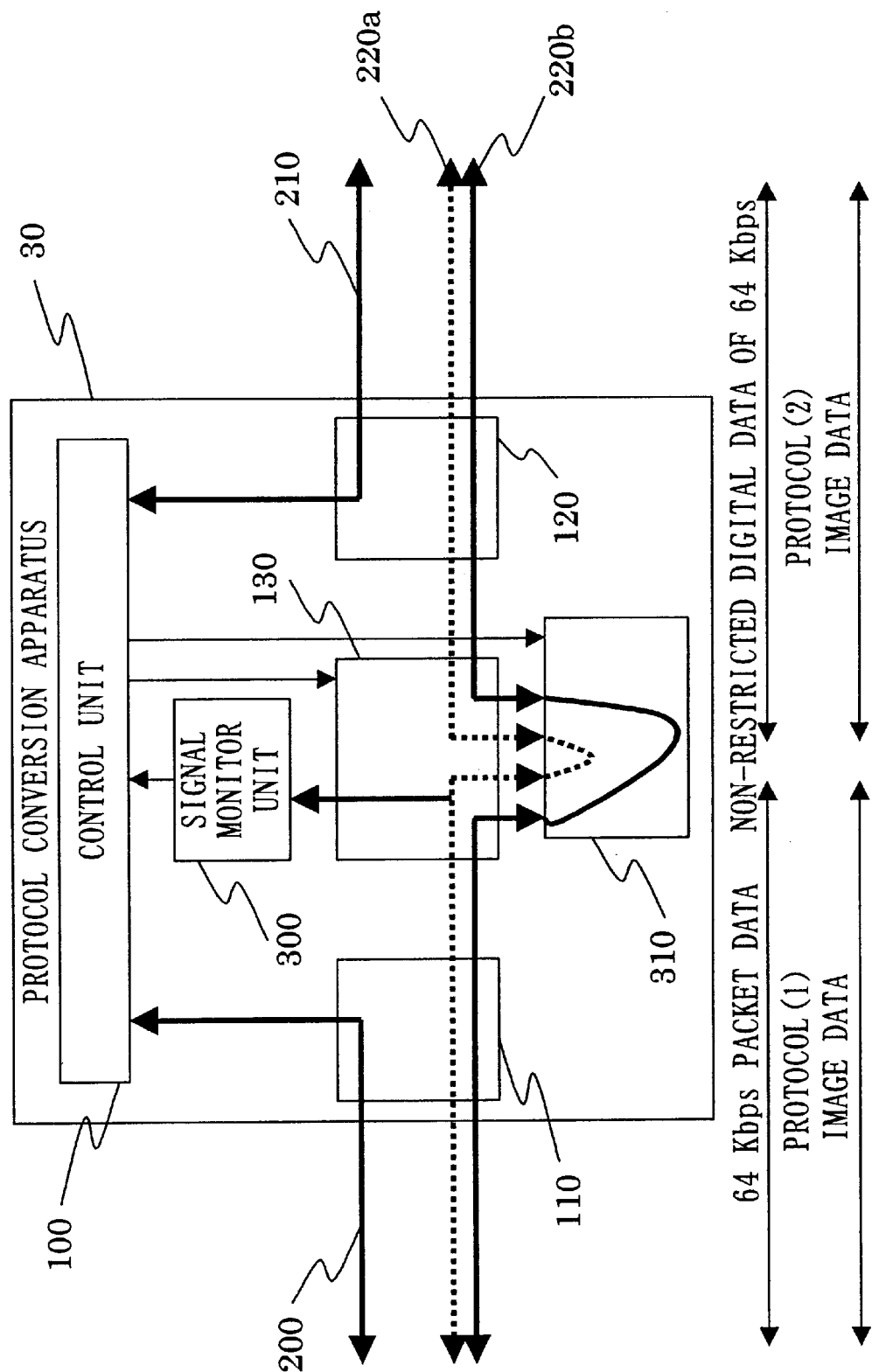
FIG. 11 shows an internal configuration of protocol conversion apparatus according to Embodiment 5.
Figure 14:
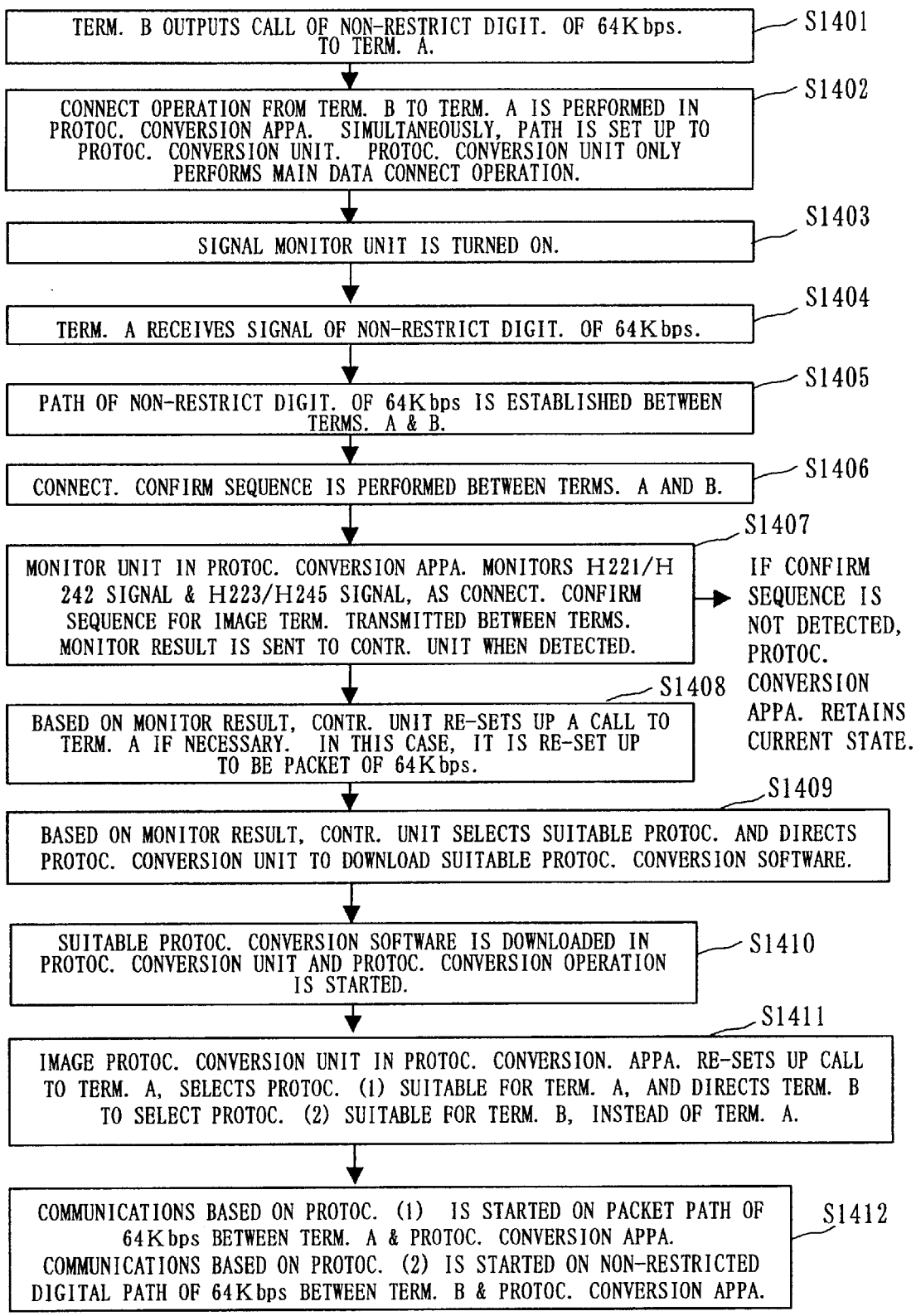
FIG. 14 shows operations of the protocol conversion apparatus and a protocol conversion method according to Embodiments 5 and 7.

FIG. 4 shows a connection state of protocol conversion apparatus according to Embodiment 5. FIG. 11 shows an internal configuration of the protocol conversion apparatus of Embodiment 5. FIG. 14 is a flowchart showing operations and a protocol conversion method according to Embodiment 5. The database for protocol conversion software is included or connected to the protocol conversion apparatus 30, though the database is not shown in the figures.

With reference to FIG. 14, operations of the protocol conversion apparatus according to the present Embodiment will be described. The operation of the terminal B 20 outputting a call of non-restricted digital data of 64 Kbps to the terminal A 10 at S1401 is the same as that of Embodiment 3.

In the present Embodiment, when a non-restricted digital bearer of 64 Kbps is set up between the terminal A 10 and the terminal B 20, the control unit 100, in advance, has already made the protocol conversion unit 310 be ready for starting. At the same time as turning on the protocol conversion unit 310, the control unit 100 controls the switch 130 and sets up a path via the public network interface unit 120, the protocol conversion unit 310, and the closed area network interface unit 130 at S1402. At this time, the protocol conversion unit 310 only performs the operation of connecting main data. By dint of the protocol conversion unit 310 having been turned on in advance, it is possible to quicken the process of downloading the protocol conversion software and performing the protocol conversion.

Then, the control unit 100 turns on the signal monitor unit 330 at S1403. The terminal A receives a non-restricted digital signal of 64 Kbps at S1404, and a non-restricted digital path of 64 Kbps is established between the terminal A and the terminal B at S1405. Next, the connectivity confirmation sequence between the terminals is started at S1406. It is assumed in the present Embodiment that the terminal A transmits the H221/H242 as the connectivity confirmation sequence for image terminal, and the terminal B transmits the H223/H245. Therefore, the signal monitor unit 330 detects the H221/H242 signal from the terminal A and the H223/H245 signal from the terminal B at S1407. Then, based on the monitor result of the signal monitor unit, the control unit 100 begins to assign a suitable protocol conversion unit. At this time, it is possible for the control unit 100 to re-set up the call to the terminal A at S1408 as well as the re-set up case in Embodiment 2. The packet of 64 Kbps is re-set up in this case.

Next, based on the monitor result of the signal monitor unit, the control unit 100 directs the protocol conversion unit 310 having already been turned on to download image protocol conversion software at S1409. Receiving the software download direction, the protocol conversion unit 310 starts operations using the image protocol conversion software which is newly set up. The time of the protocol conversion being directed can be the timing of downloading the protocol conversion software. Otherwise, it is also acceptable to download the software for the non-restricted digital of 64 Kbps and the software for the packet from the information of 64 Kbps bearer in advance, and to switch the software when the protocol conversion is directed. As shown in S1411 and S1412, the latter operation is the same as Embodiment 3.

By dint of the configuration stated above, it is possible to share the hardware for protocol conversion, effectively perform the resource control in the protocol conversion apparatus, and reduce the hardware.

Embodiment 6.

In the present Embodiment, the case of monitoring the signals of T30, V34, and V90 as the connectivity confirmation sequence for FAX/MODEM and so on, and performing the protocol conversion by using protocol conversion software will be explained.

Figure 12:
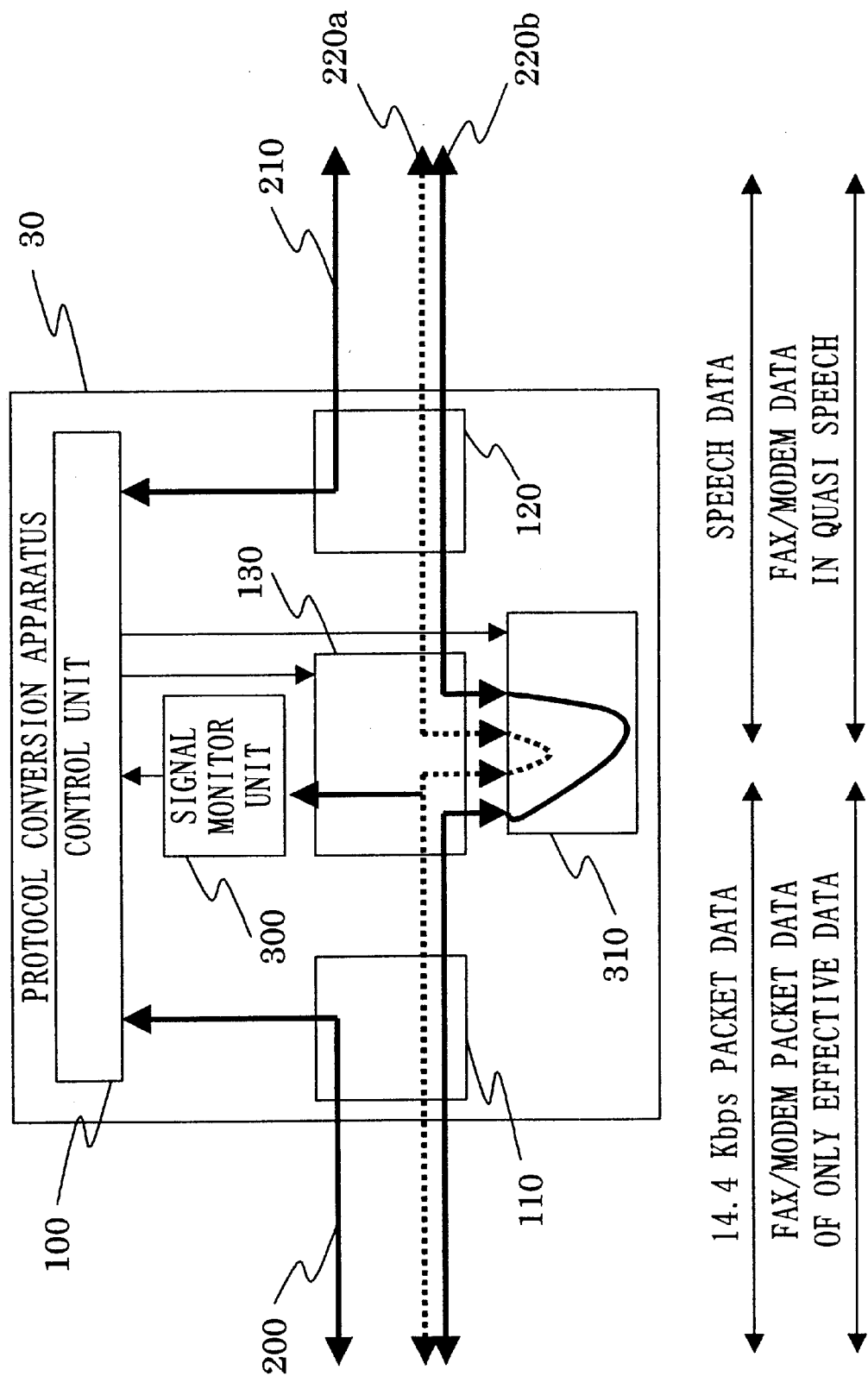
FIG. 12 shows an internal configuration of protocol conversion apparatus according to Embodiment 6.
Figure 15:
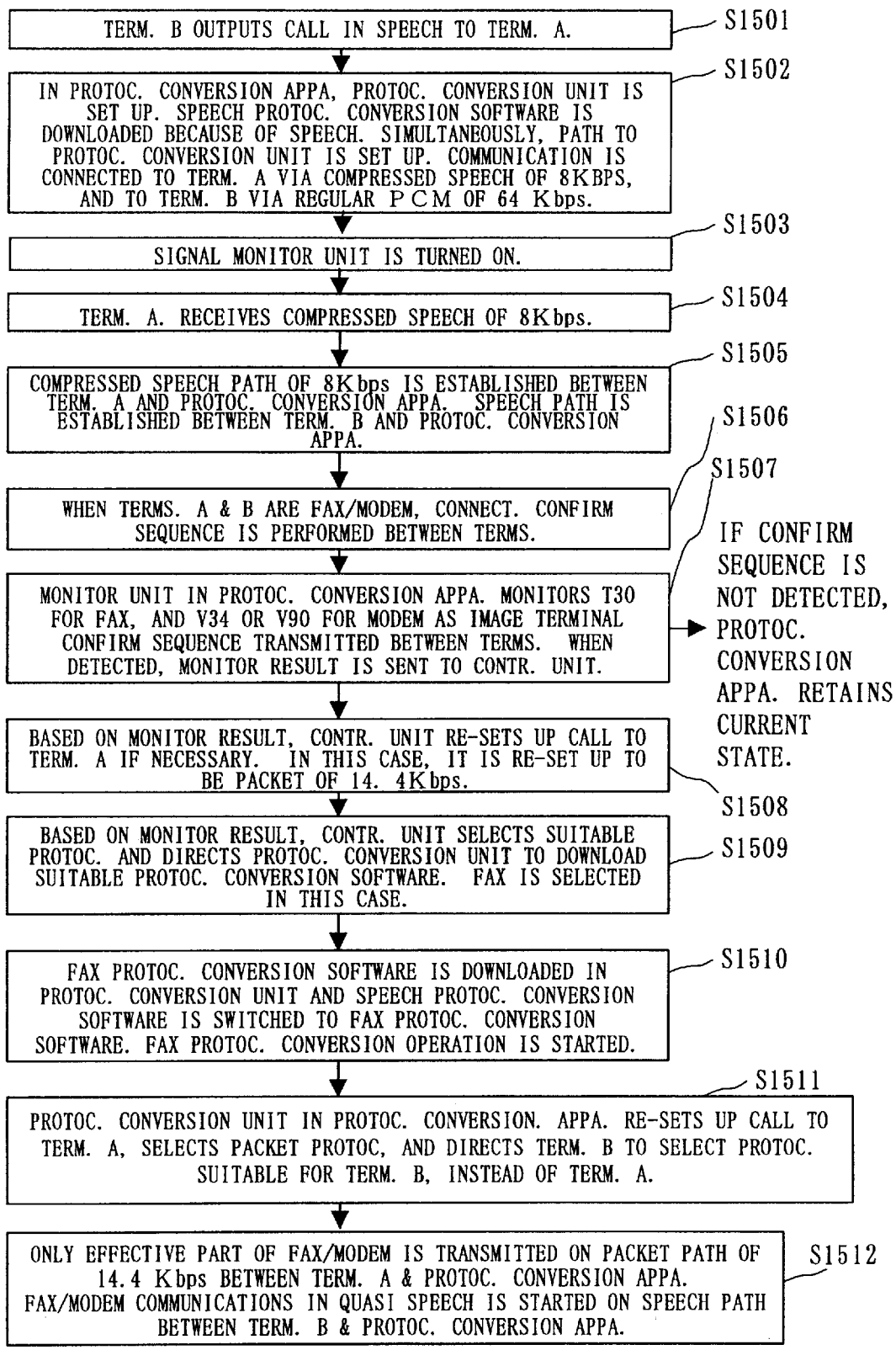
FIG. 15 shows operations of the protocol conversion apparatus and a protocol conversion method according to Embodiment 6.
Figure 16:
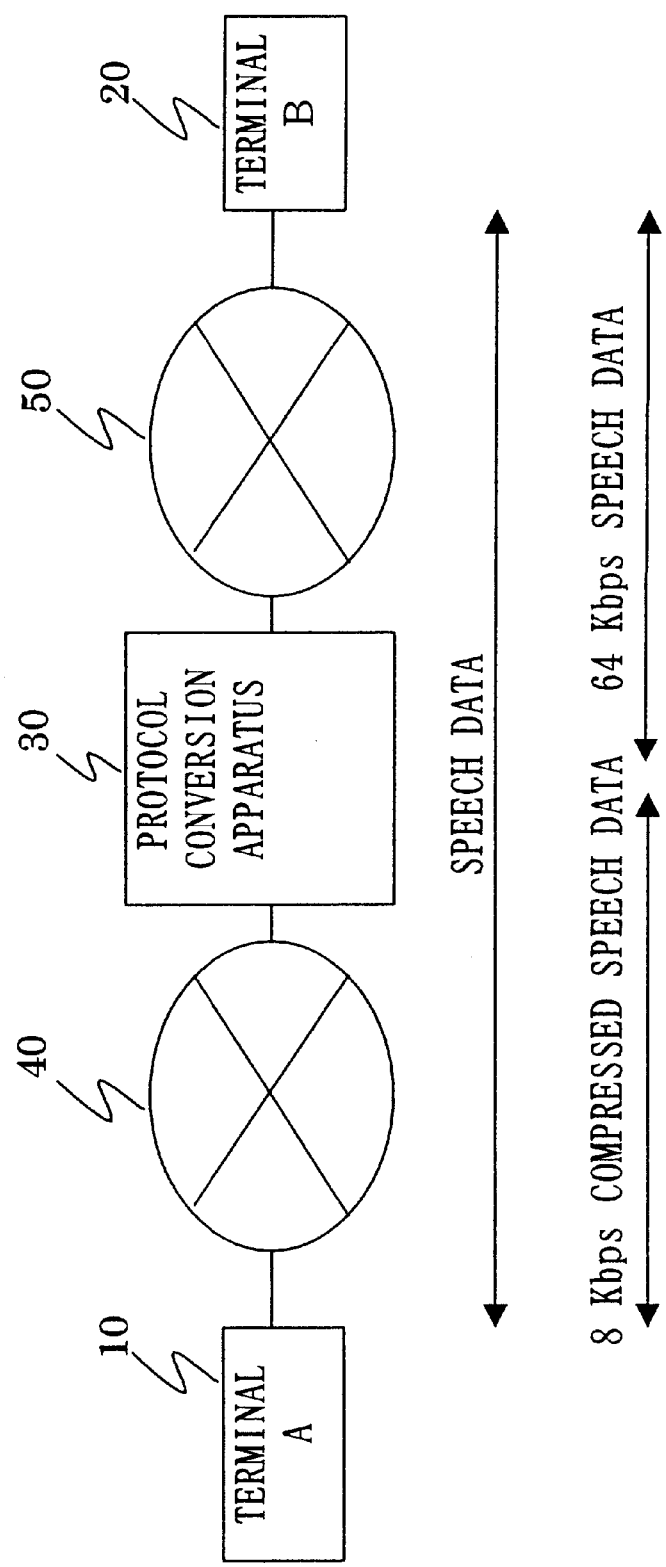
FIG. 16 shows a connection state of conventional protocol conversion apparatus.
Figure 17:
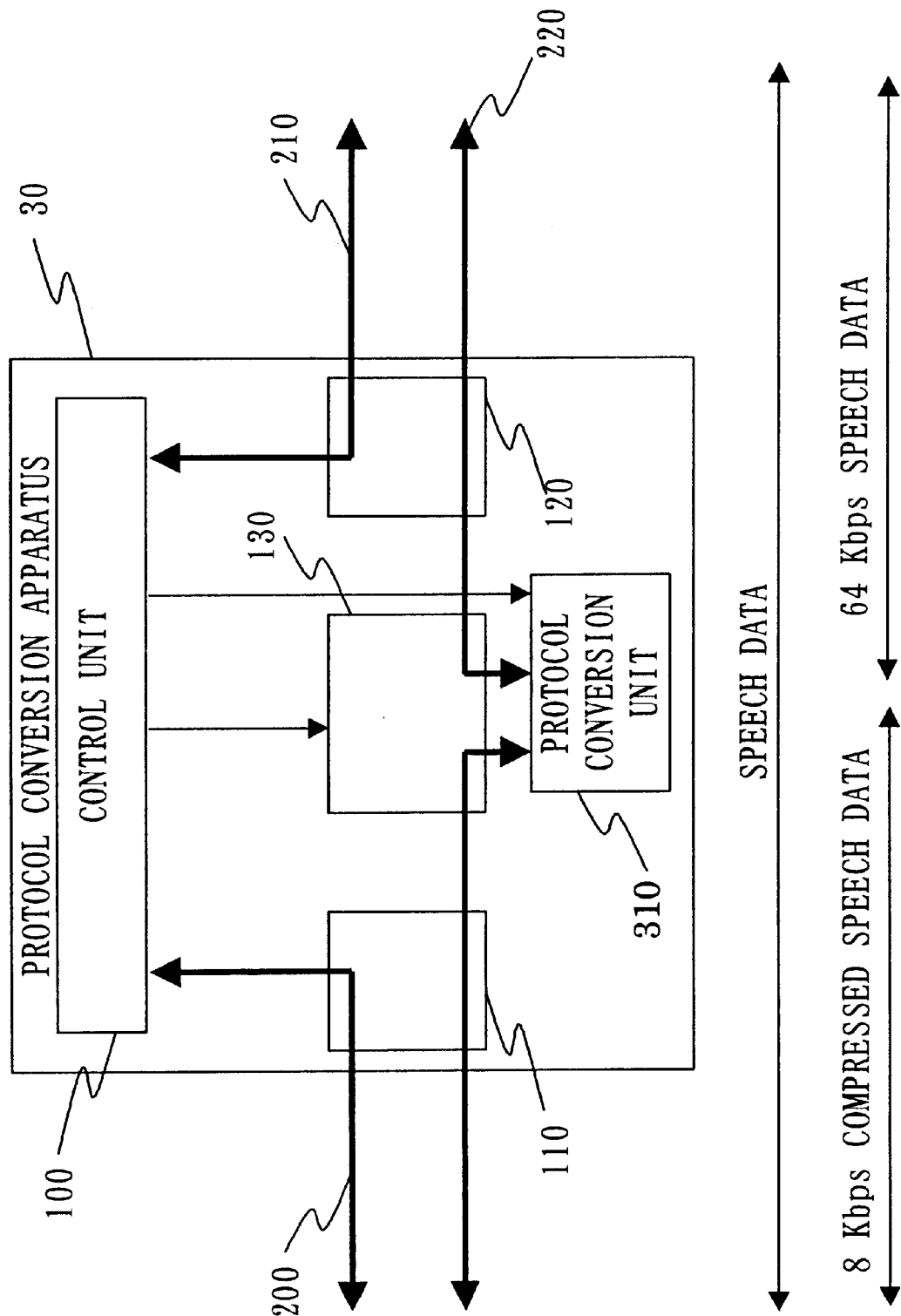
FIG. 17 shows an internal configuration of the conventional protocol conversion apparatus.
Figure 18:
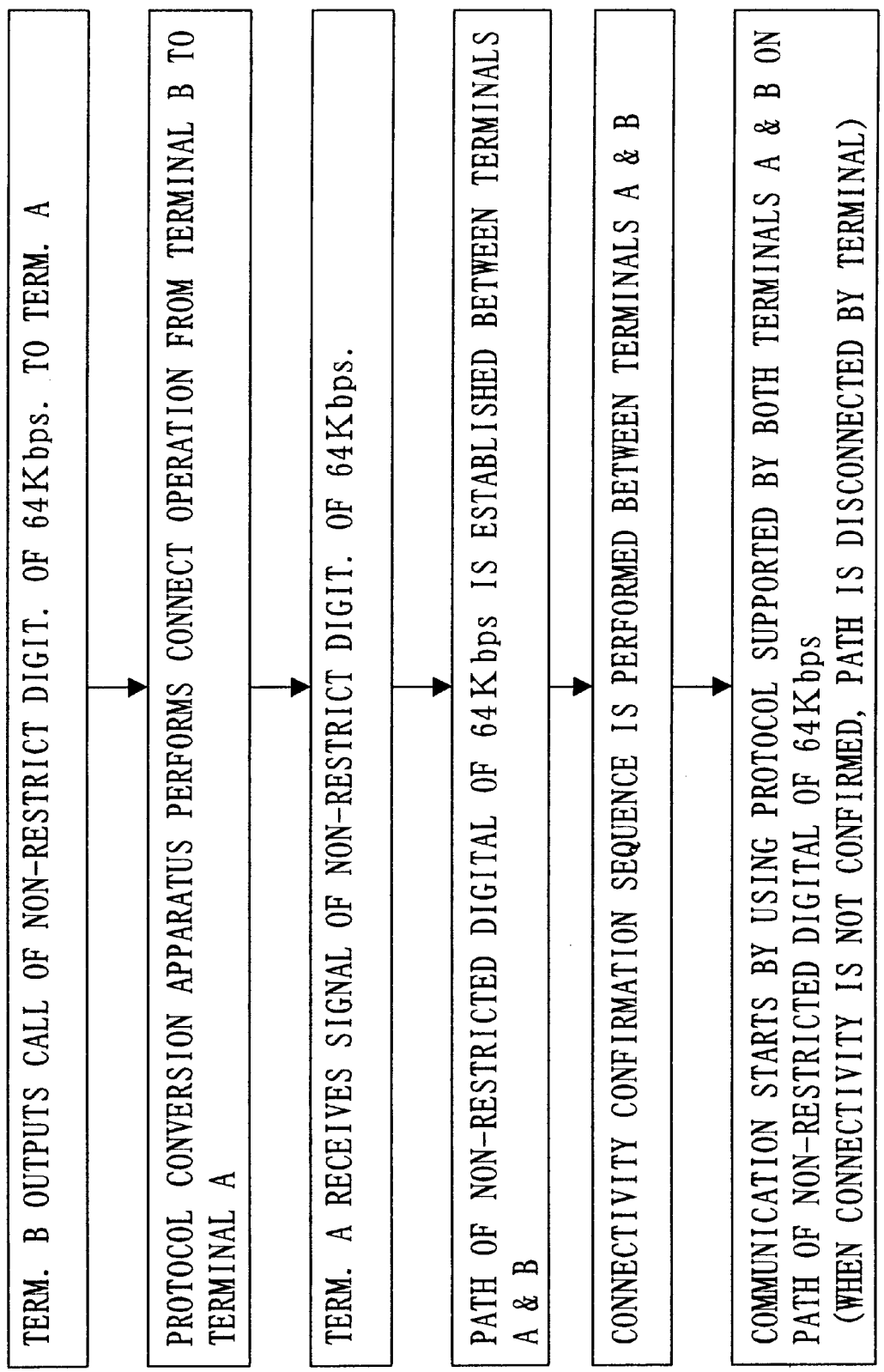
FIG. 18 shows operations of the conventional protocol conversion apparatus.

FIG. 12 shows an internal configuration of protocol conversion apparatus of Embodiment 6. FIG. 15 is a flowchart showing operations and a protocol conversion method according to Embodiment 6. Database for protocol conversion software is included in or connected to the protocol conversion apparatus 30 though the database is not shown in the figures.

With reference to FIG. 15, operations of the protocol conversion apparatus and the protocol conversion method according to the present Embodiment will be described. In the present Embodiment, the operations of the terminal B 20 outputting a call of speech data to the terminal A 10, a compressed speech path of 8 Kbps being set up between the terminal A 10 and the protocol conversion apparatus 30, and a speech path being set up between the terminal B 20 and the protocol conversion apparatus are basically the same as Embodiment 4. (S1501 through S1505) However, at S1505 in the present Embodiment, the respect that the protocol conversion unit 310 downloads speech protocol conversion software from the database for protocol conversion software in order to perform the protocol conversion is different from Embodiment 4.

Then, if the terminal A and the terminal B are FAX/MODEM, the connectivity confirmation sequence is performed between the terminals at S1506. The signal monitor unit 300 monitors the connectivity confirmation sequence between the terminals at S1507. In this case, the signal monitor unit 300 monitors the T30 signal for FAX and the V34 or V90 signal for MODEM. Besides, it is possible for the control unit 100 to re-set up the call to the terminal A at S1508 as well as the case of Embodiment 2. In this case, the packet is re-set up to be a 14.4 Kbps packet.

Based on the monitor result, the control unit 100 begins to assign a suitable protocol conversion unit. The control unit 100 directs the speech protocol conversion unit 310 having already been turned on to download the protocol conversion software for FAX/MODEM. In this case, FAX is selected at S1509. Receiving the software download direction, the protocol conversion unit 310 starts operations based on FAX protocol conversion software which is newly set up. The time of the protocol conversion being directed can be the timing of downloading the protocol conversion software. Otherwise, it is also acceptable to download a plurality of software relating to speech from the information of speech bearer in advance, and to switch the software when the protocol conversion is directed. As shown in S1511 and S1512, the latter operation is the same as Embodiment 4.

By dint of the configuration stated above, it is possible to share the hardware for protocol conversion, effectively perform the resource control in the protocol conversion apparatus, and reduce the hardware.

Embodiment 7.

Figure 13:
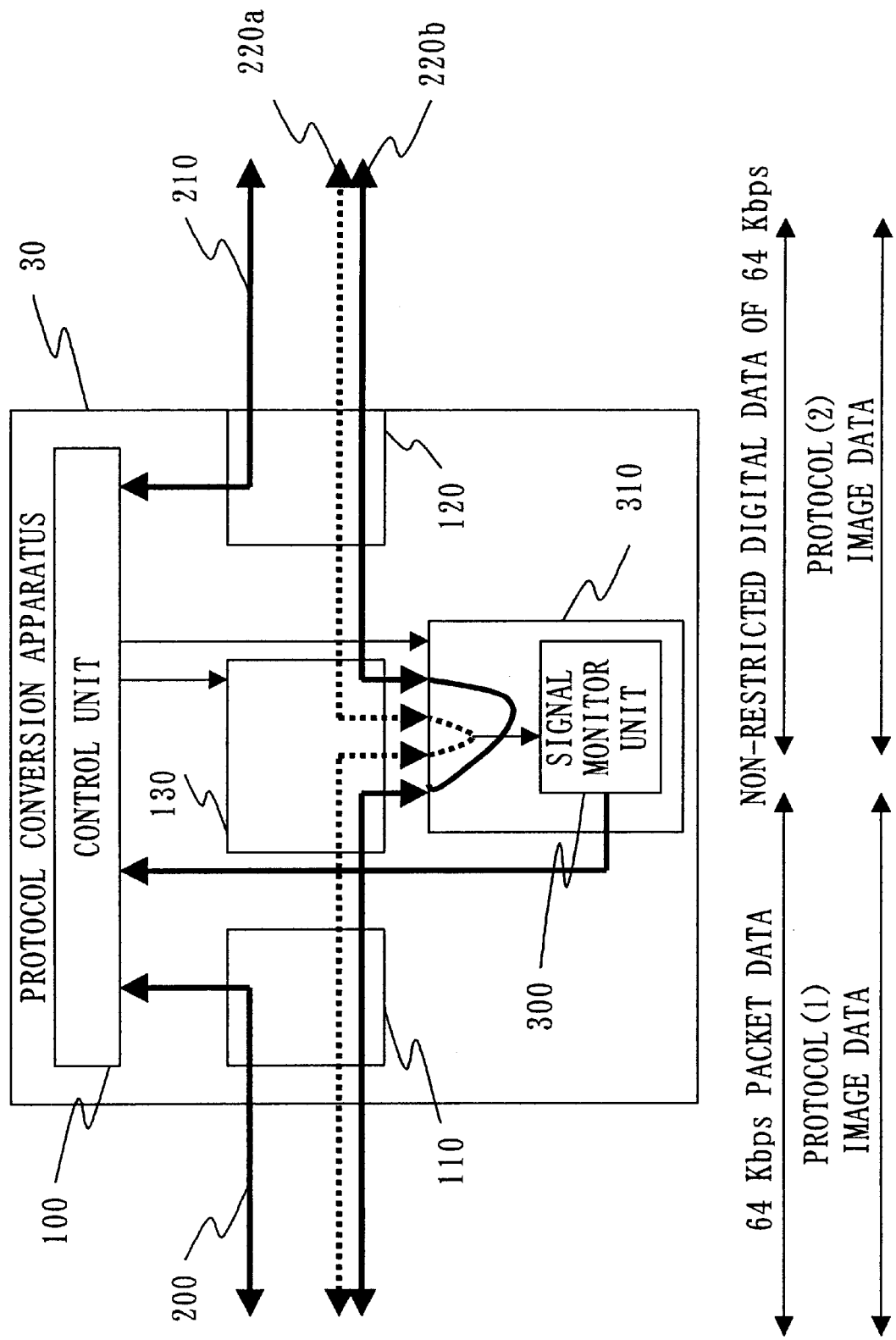
FIG. 13 shows an internal configuration of protocol conversion apparatus according to Embodiment 7.

FIG. 13 shows an internal configuration of protocol conversion apparatus according to Embodiment 7. FIG. 14 is a flowchart showing operations and a protocol conversion method of Embodiment 7.

In the present Embodiment, the signal monitor unit 300 is incorporated in the protocol conversion unit 310 as shown in FIG. 13. Therefore, the hardware of the signal monitor unit can be reduced.

The operation of the present Embodiment is similar to Embodiment 5. In the present Embodiment, the protocol conversion unit 310 has already been "on" to perform the main data connecting operation even when only the bearer setting is performed as described in Embodiment 5. By utilizing this, the protocol conversion unit 310 performs the signal monitor function, which is a feature of the present Embodiment.

By dint of the above stated configuration, it is possible to reduce the hardware of the signal monitor unit and to downsize the protocol conversion apparatus.

As described above, the protocol conversion apparatus according to the present invention has the features stated below.

The protocol conversion apparatus, for selecting a protocol for data transmitted between a plurality of terminals to be the most suitable protocol at each terminal or a network and performing adjusting operation between protocols of each terminal, includes the following:

a plurality of network interface units for treating control signals and main data from a terminal or a network, the protocol conversion unit for controlling protocols used at the terminal and the network and performing a mutual conversion between different protocols, the switching unit for connecting the network interface unit and the protocol conversion unit, the signal monitor unit for monitoring main data in the apparatus, and the control unit for sending and receiving control signals to/from the network interface unit, monitoring a monitor result from the signal monitor unit, and performing control in the apparatus.

As one of the features, a path is set up based on call setting information from the terminal, and a protocol of main data transmitted in the path and sent/received between the terminals is monitored by the signal monitor unit. When a specific protocol is detected by the signal monitor unit, the result is forwarded to the control unit. Then, based on the forwarded result, the control unit selects the most suitable protocol conversion unit and re-sets up the path in the apparatus. After the re-setting, the protocol conversion unit performs protocol processing between the plurality of terminals in order to have mutual connection.

As another of the features, a path is set up based on call setting information from the terminal, and a protocol of main data transmitted in the path and sent/received between the terminals is monitored by the signal monitor unit. When a specific protocol is detected by the signal monitor unit, the result is forwarded to the control unit. Then, based on the forwarded result, the control unit re-sets up the call to the receiving terminal and selects the most suitable protocol conversion unit, and re-sets up the path in the apparatus. After the re-setting, the protocol conversion unit performs protocol processing between the plurality of terminals in order to have mutual connection.

Further, in order to perform the above operation, the signal monitor unit monitors signals of ITU-T H221/H242, and H223/H245 used by image terminals for the connectivity confirmation before image data communication, which is one of the features of the present invention.

Besides, in order to perform the above operation, the signal monitor unit monitors signals of ITU-T T30, V34, and V90 used by FAX/MODEM terminals for the connectivity confirmation before communication, which is one of the features of the present invention.

Then, as another of the features, in the case that a path in the apparatus is set up based on call setting information from the terminal, the protocol conversion unit for performing only connecting operation is incorporated in the path. The signal monitor unit monitors a protocol of main data transmitted in the path and sent/received between the terminals. When a specific protocol is detected by the signal monitor unit, the result is forwarded to the control unit. Then, based on the forwarded result, the control unit directs the protocol conversion unit to download suitable protocol conversion software or switch to suitable protocol conversion software. The protocol conversion unit performs protocol processing between the plurality of terminals in order to have mutual connection, based on the set-up protocol conversion software.

As another of the features, in the case that a path is set up based on call setting information from the terminal, the protocol conversion unit based on the call setting information is incorporated in the path. The signal monitor unit monitors a protocol of main data transmitted in the path and sent/received between the terminals. When a specific protocol is detected by the signal monitor unit, the result is forwarded to the control unit. Then, based on the forwarded result, the control unit directs the protocol conversion unit to download suitable protocol conversion software or switch to suitable protocol conversion software. The protocol conversion unit performs protocol processing between the plurality of terminals in order to have mutual connection, based on the newly switched protocol conversion software.

As one of the configurations regarding the features, when a path is set up based on call setting information from the terminal and the protocol conversion unit for performing the connecting operation is incorporated in the path, the signal monitor unit incorporated in the protocol conversion unit is turned on at the same time, in order to perform signal monitoring inside the protocol conversion unit.

Industrial Applicability

According to the protocol conversion apparatus and the protocol conversion method of the present invention, it is possible to elicit the function of each terminal as much as possible and to perform the most suitable protocol conversion.

For instance, the mutual communication utilizing the best function of each terminal can be usefully realized by monitoring the connectivity confirmation signal transmitted between the terminals after the bearer setting and by setting up the path in the apparatus and the protocol conversion unit based on the monitor result.

The present invention has an effect that the mutual communication where the best function of each terminal is utilized and the most suitable bearer is selected can be realized by monitoring the connectivity confirmation signal transmitted between the terminals after the bearer setting, and by re-setting the path to the terminal and setting the path in the apparatus and the protocol conversion unit based on the monitor result.

According to the present invention, the mutual connection where the quality deterioration is minimized between AV terminals supporting H221/H242 and H223/H245 can be realized.

The present invention has an effect that the mutual communication where the quality deterioration is minimized and the band is effectively utilized between FAX/MODEM terminals supporting T30, V34, and V90 can be realized.

The present invention has another effect that it is possible to share the hardware for protocol conversion, effectively perform the resource control in the protocol conversion apparatus, and reduce the hardware.

Further, according to the present invention, it is possible to reduce the hardware of the signal monitor unit.

What is claimed is:

1. A protocol conversion apparatus, connected between a calling side communication terminal and a called side communication terminal, for performing protocol conversion between different communication protocols used by the calling side communication terminal and the called side communication terminal, the protocol conversion apparatus comprising:

a protocol conversion unit for performing protocol conversion between a calling side protocol used by the calling side communication terminal and a called side protocol used by the called side communication terminal;

a signal detect unit for detecting a connectivity confirmation signal transmitted between the calling side communication terminal and the called side communication terminal; and a control unit for specifying the calling side protocol to be used by the calling side communication terminal and the called side protocol to be used by the called side communication terminal based on the connectivity confirmation signal detected by the signal detect unit;

wherein the protocol conversion unit can perform a plurality of different protocol conversions between different specific protocols used by calling side communication terminals and by called side communication terminals, wherein the control unit selects one protocol conversion from the plurality of protocol conversions capable of being performed by the protocol conversion unit, based on the calling side protocol specified by the control unit to be used by the calling side communication apparatus and the called side protocol specified by the control unit to be used by the called side communication apparatus, and wherein the protocol conversion unit performs the protocol conversion selected by the control unit.

2. A protocol conversion apparatus, connected to a calling side communication terminal and a called side communication terminal, for performing protocol conversion between different communication protocols used by the calling side communication terminal and the called side communication terminal, the protocol conversion apparatus further connected to a protocol conversion software database storing a plurality of protocol conversion software of plural types corresponding to protocol conversion types, the protocol conversion apparatus comprising:

a protocol conversion unit for performing protocol conversion between a calling side protocol used by the calling side communication terminal and a called side protocol used by the called side communication terminal;

a signal detect unit for detecting a connectivity confirmation signal transmitted between the calling side communication terminal and the called side communication terminal; and a control unit for specifying the calling side protocol to be used by the calling side communication terminal and the called side protocol to be used by the called side communication terminal based on the connectivity confirmation signal detected by the signal detect unit;

wherein the control unit selects one protocol conversion software from the plurality of protocol conversion software based on the calling side protocol specified by the control unit to be used by the calling side communication apparatus and the called side protocol specified by the control unit to be used by the called side communication apparatus, and gives the protocol conversion unit directions to download a selected protocol conversion software, and wherein the protocol conversion unit downloads the selected protocol conversion software based on the directions of the control unit.

3. The protocol conversion apparatus of claim 1, wherein the signal detect unit detects the connectivity confirmation signal by monitoring a main data signal transmitted between the calling side communication terminal and the called side communication terminal.

4. The protocol conversion apparatus of claim 2, wherein the signal detect unit detects the connectivity confirmation signal by monitoring a main data signal transmitted between the calling side terminal and the called side communication terminal.

5. The protocol conversion apparatus of claim 1, wherein the control unit sets up a line between the protocol conversion unit and the called side communication terminal, based on the connectivity confirmation signal detected by the signal detect unit.

6. The protocol conversion apparatus of claim 2, wherein the control unit sets up a line between the protocol conversion unit and the called side communication terminal, based on the connectivity confirmation signal detected by the signal detect unit.

7. The protocol conversion apparatus of claim 1, wherein the control unit has already made the protocol conversion unit be ready for starting before the signal detect unit detects the connectivity confirmation signal.

8. The protocol conversion apparatus of claim 2, wherein the control unit has already made the protocol conversion unit be ready for starting before the signal detect unit detects the connectivity confirmation signal.

9. The protocol conversion apparatus of claim 1, wherein the signal detect unit is included in the protocol conversion unit.

10. The protocol conversion apparatus of claim 2, wherein the signal detect unit is included in the protocol conversion unit.

11. The protocol conversion apparatus of claim 1, wherein the signal detect unit detects one of H221/H242 and H223/H245 based on ITU-T Recommendation used as the connectivity confirmation signal for image data communication.

12. The protocol conversion apparatus of claim 2, wherein the signal detect unit detects one of H221/H242 and H223/H245 based on ITU-T Recommendation used as the connectivity confirmation signal for image data communication.

13. The protocol conversion apparatus of claim 1, wherein the signal detect unit detects one of T30, V34, and V90 based on ITU-T Recommendation used as the connectivity confirmation signal for FAX/MODEM communication.

14. The protocol conversion apparatus of claim 2, wherein the signal detect unit detects one of T30, V34, and V90 based on ITU-T Recommendation used as the connectivity confirmation signal for FAX/MODEM communication.

15. A protocol conversion method for performing protocol conversion between a calling side communication terminal and a called side communication terminal comprising the steps of:

detecting a connectivity confirmation signal transmitted between the calling side communication terminal and the called side communication terminal;

specifying a calling side protocol to be used by the calling side communication terminal and a called side protocol to be used by the called side communication terminal based on the connectivity confirmation signal detected in the detecting step; and performing protocol conversion between different communication protocols used by the calling side protocol of the calling side communication terminal and the called side protocol of the called side communication terminal;

wherein the performing protocol conversion step can perform a plurality of different protocol conversions between different specific protocols used by calling side communication terminals and by called side communication terminals;

wherein the specifying the calling side protocol and the called side protocol step selects one protocol conversion from the plurality of protocol conversions capable of being performed in the performing protocol conversion step, based on the calling side protocol specified by the control unit to be used by the calling side communication terminal and the called side protocol specified by the control unit to be used by the called side communication terminal, and wherein the performing protocol conversion step performs protocol conversion selected in the specifying the calling side protocol and the called side protocol step.

* * * * *